(12) United States Patent
Tanimoto

(10) Patent No.: US 9,753,872 B2
(45) Date of Patent: Sep. 5, 2017

(54) INFORMATION PROCESSING APPARATUS, INPUT AND OUTPUT CONTROL DEVICE, AND METHOD OF CONTROLLING INFORMATION PROCESSING APPARATUS

(71) Applicant: FUJITSU LIMITED, Kawasaki-shi, Kanagawa (JP)

(72) Inventor: Teruo Tanimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 14/730,759

(22) Filed: Jun. 4, 2015

(65) Prior Publication Data
US 2015/0370732 A1   Dec. 24, 2015

(30) Foreign Application Priority Data

Jun. 18, 2014  (JP) .................................. 2014-125150

(51) Int. Cl.
G06F 15/173  (2006.01)
G06F 13/16   (2006.01)
G06F 12/06   (2006.01)
G06F 13/14   (2006.01)

(52) U.S. Cl.
CPC ...... *G06F 13/1663* (2013.01); *G06F 12/0669* (2013.01); *G06F 13/14* (2013.01); *G06F 13/1642* (2013.01); *G06F 2212/2542* (2013.01)

(58) Field of Classification Search
USPC .......................... 709/227, 238, 245, 220, 223
See application file for complete search history.

(56) References Cited

U.S. PATENT DOCUMENTS

2013/0159638 A1   6/2013   Koinuma et al.

FOREIGN PATENT DOCUMENTS

JP   2013-130976   7/2013

*Primary Examiner* — Lan-Dai T Truong
(74) *Attorney, Agent, or Firm* — Staas & Halsey LLP

(57) ABSTRACT

A control device is coupled to node devices and one or more input and output devices, each node device including an arithmetic processing unit and a memory. The control device is configured to store history information including an entry in which device identification information for identifying the input and output device that is accessed based on a request corresponds to node identification information for identifying a node device of the node devices which is a transmission source of the request; determine the node identification information corresponding to the device identification information that indicates an input and output device which outputs a memory access request to the memory based on search of the entry in the history information; generate a packet in which the determined node identification information is set to a memory access destination based on the memory access request; and output the generated packet.

20 Claims, 24 Drawing Sheets

FIG. 6

|  | NDID | VALID | PTID |
|---|---|---|---|
| (ND0) | 0 | 1 | 0 |
| (ND1) | 1 | 1 | 1 |
| (ND2) | 2 | 1 | 2 |
| (ND3) | 3 | 1 | 3 |
| (ND4) | 4 | 1 | 4 |
| (IOH) | 5 | 0 | 5 |
|  | ⋮ | ⋮ | ⋮ |
|  | 63 | 0 | 0 |

| IOID | VALID | NDID |
|------|-------|------|
| 0    | 1     | 0    |
| 1    | 1     | 1    |
| 2    | 1     | 0    |
| ⋮    | ⋮     | ⋮    |

FIG. 13
(INITIAL STATE)
(a)
| IOID | VALID | NDID |
|------|-------|------|
| 0 | 0 | 0 |
| 1 | 0 | 0 |
RESPONSE PACKET WITH RESPECT TO ACCESS REQUEST BY IOID=1 IS RECEIVED FROM NDID=1  (b)
(c)
| IOID | VALID | NDID |
|------|-------|------|
| 0 | 0 | 0 |
| 1 | 1 | 1 |
RESPONSE PACKET WITH RESPECT TO ACCESS REQUEST BY IOID=1 IS RECEIVED FROM NDID=1  (d)
(e)
| IOID | VALID | NDID |
|------|-------|------|
| 0 | 0 | 0 |
| 1 | 1 | 1 |
⋮
RESPONSE PACKET WITH RESPECT TO ACCESS REQUEST BY IOID=0 IS RECEIVED FROM NDID=0 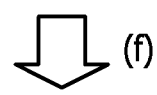 (f)
(g)
| IOID | VALID | NDID |
|------|-------|------|
| 0 | 1 | 1 |
| 1 | 1 | 1 |

FIG. 15
CASE WHERE PREDICTION IS
CORRECT
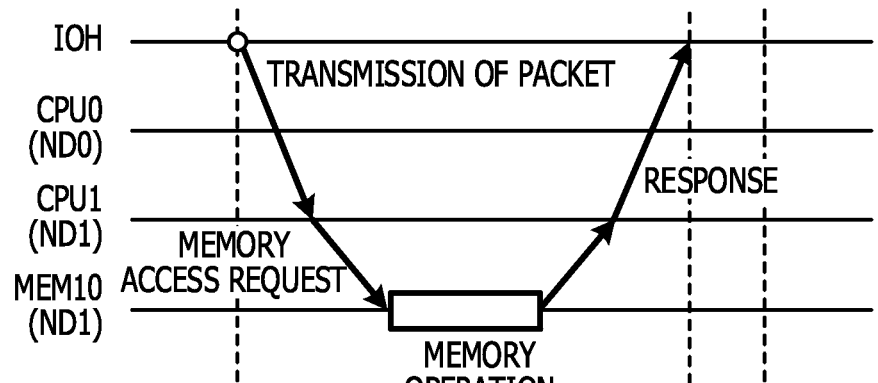
CASE WHERE PREDICTION IS
INCORRECT
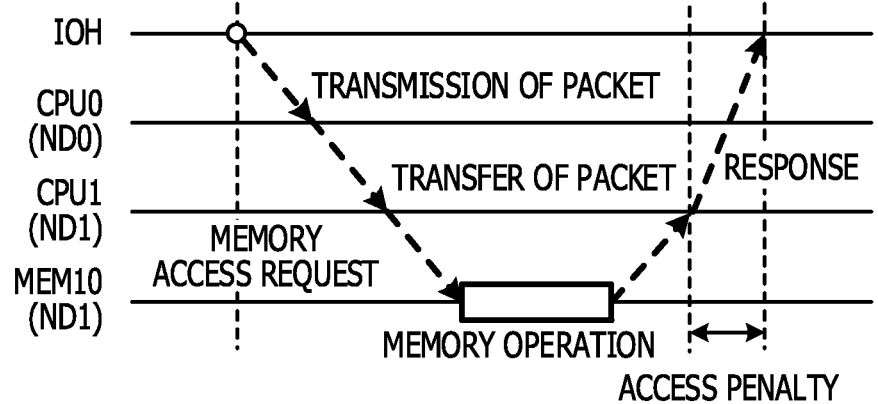

INFORMATION PROCESSING APPARATUS, INPUT AND OUTPUT CONTROL DEVICE, AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2014-125150, filed on Jun. 18, 2014, the entire contents of which are incorporated herein by reference.

FIELD

The embodiments discussed herein are related to an information processing apparatus, an input and output control device, and a method of controlling the information processing apparatus.

BACKGROUND

In the related art, a Symmetric Multi-Processor (SMP) that couples a plurality of memories to a plurality of arithmetic processing units through a common bus is known. Furthermore, a Non-Uniform Memory Access (NUMA) type system to which a plurality of nodes respectively including a plurality of arithmetic processing units and a plurality of memories are coupled through interconnect is known. In the NUMA type system, each memory is assigned to a common address space without overlapping and is accessible by the arithmetic processing unit of the node having this memory and the arithmetic processing unit of another node. For example, each node has a table in which information identifying the node assigned in each address region of a predetermined size in which the common address space is assigned. That is, each node has a table in which information indicating a corresponding relationship between the address region and the node is stored. Then, each node determines the node in which the memory to be accessed by a packet is included between the node having this memory and another node by referring to the table.

As an example of the related art, Japanese Laid-open Patent Publication No. 2013-130976 is known.

If an input and output control device controlling an input and output device is coupled to the node through interconnect and data is transferred between the input and output device and the node, the input and output control device has a table similar to the table included in each node. Then, the input and output control device determines a destination node through which the packet is output by referring to the table based on an access request from the input and output device.

If a new arithmetic processing unit is developed and a specification of the table storing the information indicating the corresponding relationship between the address region and the node is changed, it is difficult to use the existing input and output control device. In this case, an input and output control device having a table similar to a table of a new specification is newly developed.

SUMMARY

According to an aspect of the invention, an information processing apparatus includes a plurality of node devices that respectively include an arithmetic processing unit and one or more first memories coupled to the arithmetic processing unit; and an input and output control device that is coupled to the plurality of node devices and one or more input and output devices. The input and output control device includes one or more second memories configured to store history information including an entry in which input and output device identification information for identifying the input and output device that is accessed based on a request corresponds to node identification information for identifying a node device of the plurality of node devices which is a transmission source of the request, and a controller coupled to the one or more second memories. The controller is configured to: determine the node identification information corresponding to the input and output device identification information that indicates an input and output device which outputs a memory access request to the one or more first memories based on search of the entry in the history information, generate a packet in which the determined node identification information is set to a memory access destination based on the memory access request, and output the generated packet. each of the plurality of node devices includes a third memory configured to store first corresponding information in which a physical address range corresponds to the node identification information for each physical address range of the one or more first memories, and a processor coupled to the third memory and configured to: receive the packet output from the input and output control device, obtain the node identification information corresponding to a physical address included in the received packet based on the first corresponding information, determine whether the obtained node identification information is the node identification information identifying own node device, and transfer the received packet to another node device when it is determined that the obtained node identification information is not the node identification information that identifies the own node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a routing table illustrated in FIG. 5;

FIG. 8 illustrates an example of an access history table illustrated in FIG. 5;

FIG. 13 illustrates an example of updating the access history table illustrated in FIG. 8;

FIG. 15 illustrates a comparative example of an access time if the prediction of the prediction section is correct and if the prediction of the prediction section is incorrect;

DESCRIPTION OF EMBODIMENTS

An information processing apparatus, an input and output control device, and a control method of the information processing apparatus of the present disclosure are provided to transmit and receive a packet without decreasing a coupling property between the input and output control device and the arithmetic processing unit even if a new arithmetic processing unit is developed.

Hereinafter, an embodiment will be described with reference to the drawings.

Figure 1:
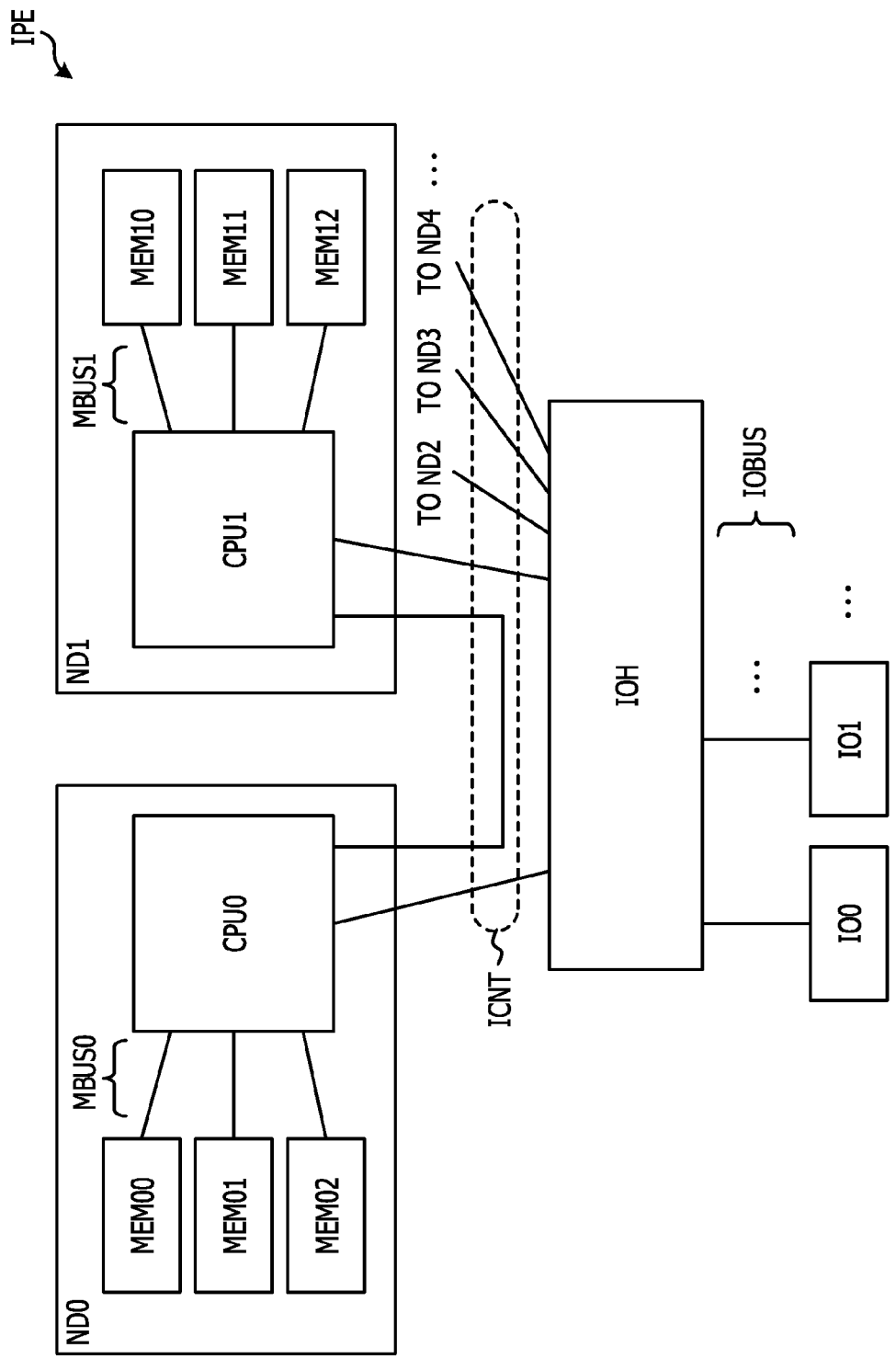
FIG. 1 illustrates an embodiment of an information processing apparatus, an input and output control device, and a control method of the information processing apparatus.

FIG. 1 illustrates an embodiment of an information processing apparatus, an input and output control device, and a control method of the information processing apparatus. An information processing apparatus IPE illustrated in FIG. 1 has nodes ND (ND0 and ND1) coupled to each other through an interconnect ICNT and an input and output control device IOH. The node ND is an example of the arithmetic processing unit that processes the calculation. The input and output control device IOH is coupled to a plurality of input and output devices IO (IO0 and IO1) through input and output buses IOBUS and controls an operation of the input and output device IO. The input and output device IO is a device that inputs and outputs information of a Hard Disk Drive (HDD) device, a Solid State Drive (SSD) device, a communication device, or a network interface device, and the like.

The node ND0 has a central processing unit (CPU) 0 and memories MEM (MEM00, MEM01, and MEM02) coupled to the CPU0 through memory buses MBUS0. The node ND1 has a CPU1 and memories MEM (MEM10, MEM11, and MEM12) coupled to the CPU1 through memory buses MBUS1. The memories MEM00, MEM01, and MEM02 are coupled to the CPU0 through the memory buses MBUS0 which are independent from each other and the memories MEM10, MEM11, and MEM12 are coupled to the CPU1 through the memory buses MBUS1 which are independent from each other.

Each memory MEM is assigned to a common address space that is assigned to the CPU0 and the CPU1 and each of the CPU0 and the CPU1 may execute information processing by distributing the information processing using the memories MEM of the nodes ND0 and ND1. An access speed of the node ND when the node ND accesses the memory MEM of the node having this memory MEM is faster than an access speed when the node ND accesses the memory MEM of another node. That is, the information processing apparatus IPE has architecture of a NUMA type system.

The memory MEM is a main memory such as a Dual Inline Memory Module (DIMM). A storage capacity of each memory MEM is, for example, 4 gigabytes (GB). Moreover, the number of node ND, the number of input and output device IO, and the number of the memory MEM coupled each CPU included in the information processing apparatus IPE are not limited to the numbers illustrated in FIG. 1.

The input and output control device IOH accesses one of the input and output devices IO and inputs and outputs data to and from the input and output device IO based on a request from the CPU. Furthermore, the input and output control device IOH transmits the request to the CPU (CPU0 or CPU1) to which the memory MEM that is an access target is coupled based on a memory access request from the input and output device IO.

Figure 2:
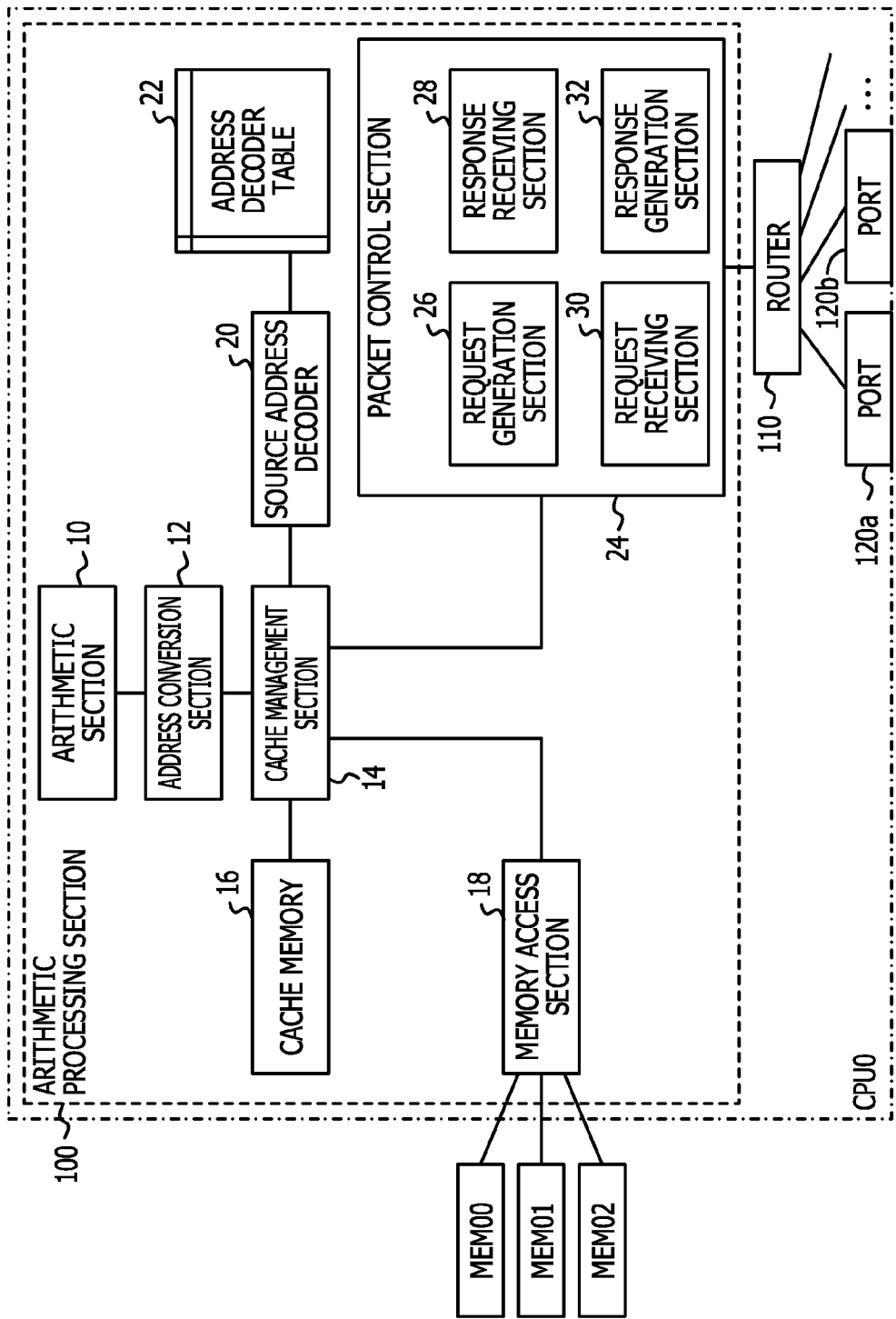
FIG. 2 illustrates an example of a CPU illustrated in FIG. 1.

FIG. 2 illustrates an example of the CPU illustrated in FIG. 1. Since the CPU0 and the CPU1 have configurations the same as or similar to each other, in FIG. 2, the CPU0 is described as an example. The CPU0 has an arithmetic processing section 100, a router 110, and a plurality of ports 120 (120a, 120b, ... ). The port 120a is coupled to the input and output control device IOH through the interconnect ICNT illustrated in FIG. 1 and the port 120b is coupled to the CPU1 through the interconnect ICNT.

The arithmetic processing section 100 has an arithmetic section 10, an address conversion section 12, a cache management section 14, a cache memory 16, a memory access section 18, a source address decoder 20, an address decoder table 22, and a packet control section 24.

The arithmetic section 10 has a decoder for decoding instructions such as an operation instruction and a memory access instruction included in a program that is executed by the CPU0, a calculator that executes the decoded instruction, and the like. The address conversion section 12 converts a logic address output from the arithmetic section 10 into a physical address and outputs the converted physical address to the cache management section 14. The address conversion section 12 includes a Translation Lookaside Buffer (TLB).

The cache management section 14 executes determination of whether data corresponding to the physical address is stored in the cache memory 16 based on the physical address from the address conversion section 12 or the physical address received from the packet control section 24. The cache management section 14 accesses the cache memory 16 if the data is stored in the cache memory 16 (cache hit). Meanwhile, the cache management section 14 outputs the physical address to the source address decoder 20 if the data corresponding to the physical address received from the address conversion section 12 or the packet control section 24 is not stored in the cache memory 16 (cache miss).

Figure 3:
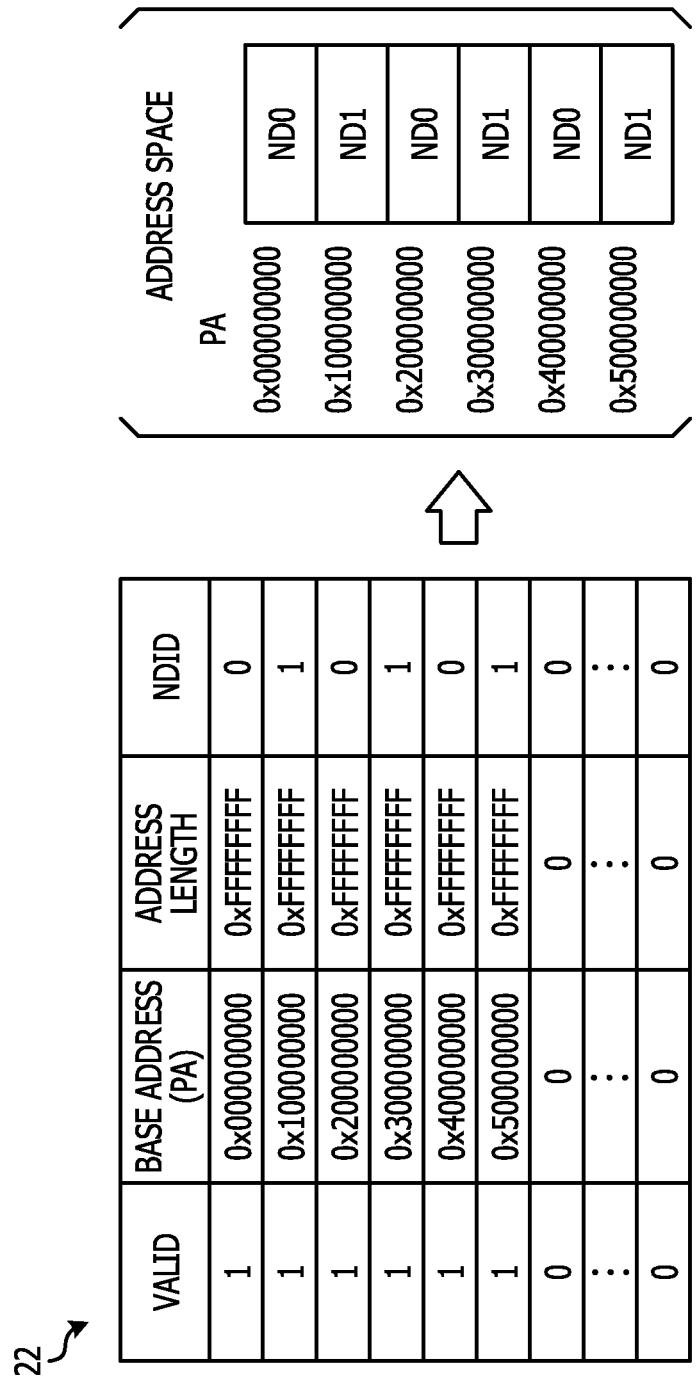
FIG. 3 illustrates an example of an address decoder table illustrated in FIG. 2.
Figure 4:
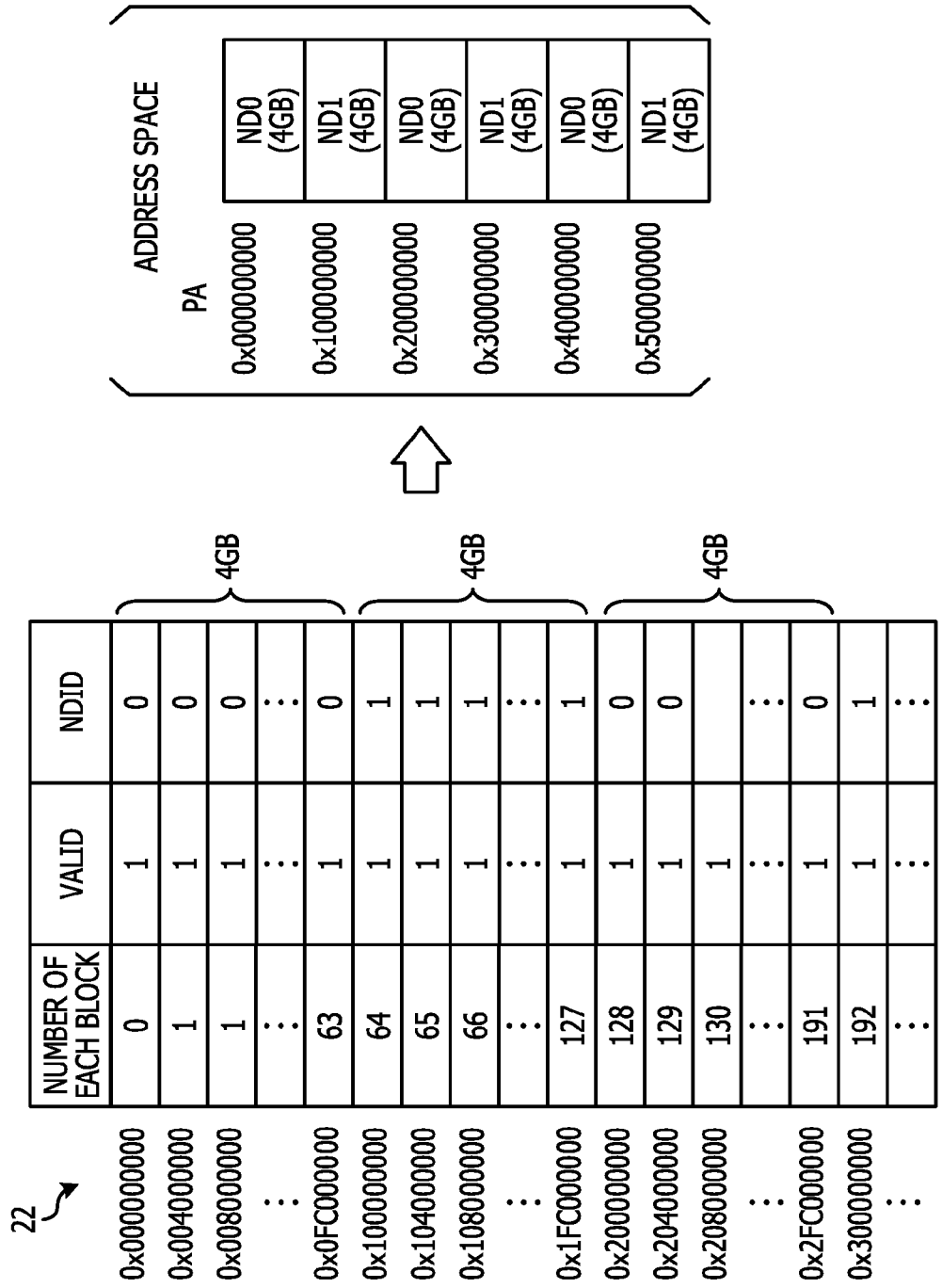
FIG. 4 illustrates another example of an address decoder table illustrated in FIG. 2.

The source address decoder 20 refers to the address decoder table 22 based on the address from the cache management section 14 and obtains the node ND including the memory MEM to which the physical address is assigned. The source address decoder 20 outputs identification information indicating the obtained node ND to the cache management section 14. The source address decoder 20 is an example of a decoder that searches for a physical address PA included in the packet that is received by a request receiving section 30 from the address decoder table 22 and outputs identification information NDID that is a searched result. An example of the address decoder table 22 is illustrated in FIGS. 3 and 4.

In a case of the cache miss, the cache management section 14 outputs the memory access request accessing one of the memories MEM00, MEM01, and MEM02 to the memory access section 18 if the identification information NDID from the source address decoder 20 indicates the node having the memories MEM00, MEM01, and MEM02. In a case of cache miss, the cache management section 14 outputs the memory access request to the memory MEM of another node to the packet control section 24 if the identification information NDID from the source address decoder 20 indicates the other node. The cache management section 14 is an example of a management section that determines whether the identification information NDID output by the source address decoder 20 is the identification information corresponding to the node having the memories MEM00, MEM01, and MEM02. Furthermore, the cache management section 14 is an example of a management section that transfers the packet received by the request receiving section 30 to the other node ND if the identification information NDID output by the source address decoder 20 is not the identification information corresponding to the node having the memories MEM00, MEM01, and MEM02.

The memory access section 18 writes data received from the cache management section 14 on one of the memories MEM00, MEM01, and MEM02 if the memory access request from the cache management section 14 is a write request. The memory access section 18 read-accesses one of the memories MEM00, MEM01, and MEM02 and outputs the data output from the read-accessed memory MEM to the cache management section 14 if the memory access request from the cache management section 14 is a read request.

The packet control section 24 has a request generation section 26, a response receiving section 28, the request receiving section 30, and a response generation section 32. The request generation section 26 generates the packet and outputs the generated packet to the router 110 based on the memory access request from the cache management section 14 to the memory MEM of the other node. If the packet is a store request to write the data to the memory MEM of the other node, the packet includes the physical address indicating an access destination in the memory MEM of the other node and writing data. If the packet is a load request to read the data from the memory MEM of the other node, the packet includes the physical address indicating the access destination in the memory MEM of the other node. Furthermore, the request generation section 26 generates the packet and outputs the generated packet to the router 110 based on the access request from the cache management section 14 to the input and output device IO.

The response receiving section 28 receives the response packet in response to the packet output by the request generation section 26 and outputs the information included in the received packet to the cache management section 14. If the packet is a response with respect to the store request to the memory MEM of the other node, the packet includes information indicating that writing of the data to the memory MEM of the other node succeeds. If the packet is a response with respect to the load request to the memory MEM of the other node, the packet includes information regarding whether reading of the data succeeds and read data.

The request receiving section 30 receives the packet from the other node ND supplied through the router 110 or the input and output control device IOH and outputs the information included in the received packet to the cache management section 14. If the packet is the store request to write the data to the memory MEM of the node having the memories MEM00, MEM01, and MEM02, the packet includes the physical address indicating the access destination of the memory MEM and the writing data. The packet is the load request to read the data from the memory MEM of the node having the memories MEM00, MEM01, and MEM02, the packet includes the physical address indicating the access destination of the memory MEM. The request receiving section 30 is an example of a receiving section that receives the packet output by the input and output control device IOH.

Figure 9:
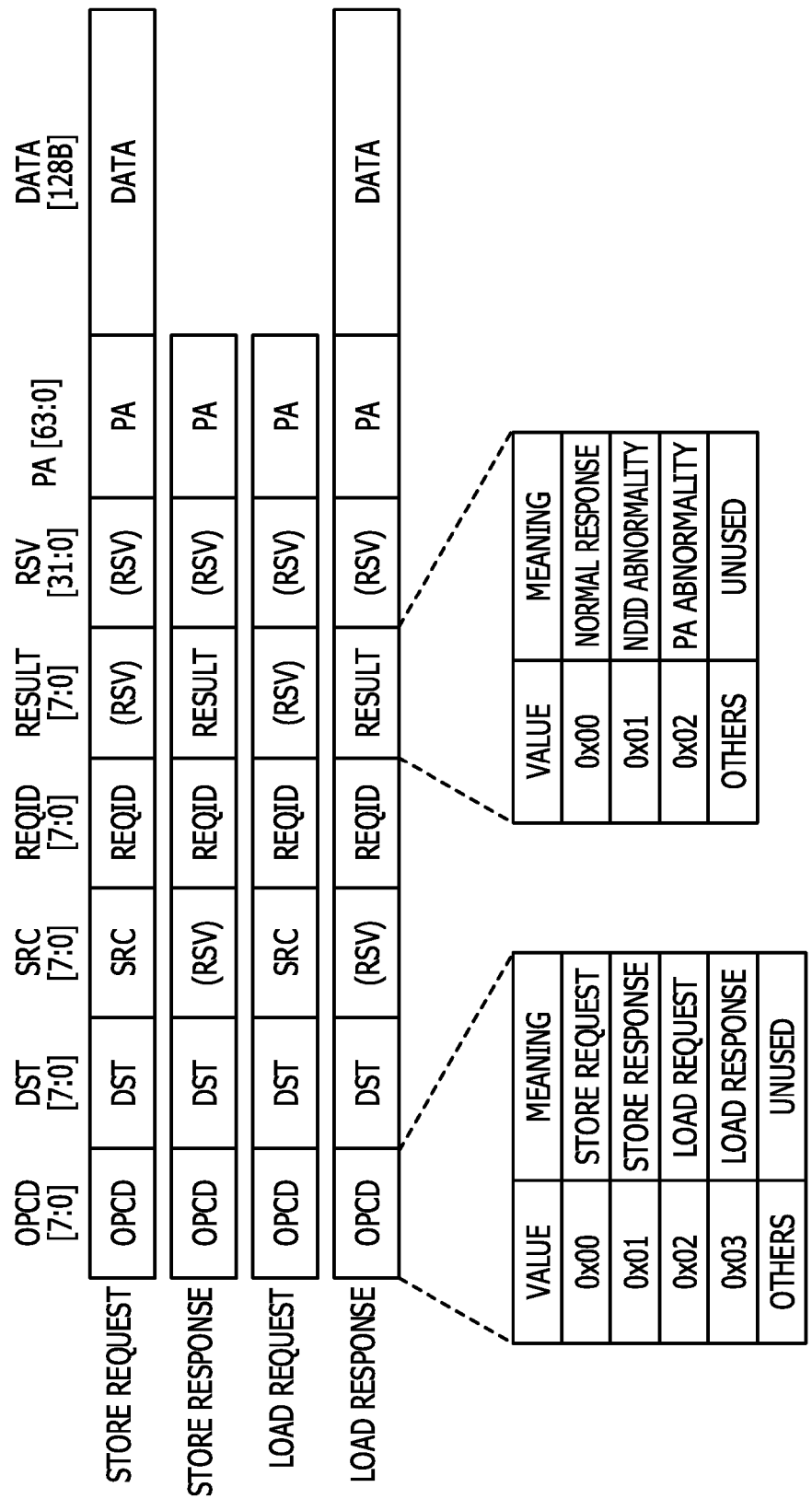
FIG. 9 illustrates an example of a packet interchanged between the node and the input and output control device through interconnect illustrated in FIG. 1.

The response generation section 32 generates the response packet with respect to the packet of the store request or the load request to the memory MEM of the node having the memories MEM00, MEM01, and MEM02, and outputs the generated response packet to the router 110. The response packet with respect to the store request to the memory MEM of the node having the memories MEM00, MEM01, and MEM02 includes information indicating that the writing of the data to the memory MEM of the node having the memories MEM00, MEM01, and MEM02 succeeds. The response packet with respect to the load request to the memory MEM of the node having the memories MEM00, MEM01, and MEM02 includes information regarding whether reading of the data succeeds and the read data. An example of the packet is illustrated in FIG. 9.

The router 110 outputs the packet output from the request generation section 26 or the response generation section 32 to the input and output control device IOH or the other node ND through one of the ports 120a and 120b. Furthermore, the router 110 outputs the packet received from the input and output control device IOH or the other node ND to the response receiving section 28 or the request receiving section 30 through one of the ports 120a and 120b.

Moreover, each CPU may have a routing table having a plurality of regions storing the identification information that identifies the node ND and the input and output control device IOH, and port information that indicates the number of each port to which the node ND and the input and output control device IOH are coupled. In this case, the router 110 determines the destination port that transmits the packet referring to the routing table.

FIG. 3 illustrates an example of the address decoder table 22 illustrated in FIG. 2. The address decoder table 22 has a plurality of regions (each row of the address decoder table 22 illustrated in FIG. 3) storing the identification information NDID identifying a VALID flag, a base address, an address length, and the number of each node ND. That is, the address decoder table 22 stores a plurality of entries including the VALID flag, the base address, the address length, and the identification information NDID. "0x" of a beginning of a value stored in the base address and the address length indicates that the stored value is a hexadecimal number.

The VALID flag is set to be "1" if the entry is valid and is set to be "0" if the entry is invalid. Each entry makes the base address (physical address PA) a starting address and indicates a node ND where an address space indicated by the address length is assigned.

In the example of the address decoder table 22 illustrated in FIG. 3, as illustrated on a right side in FIG. 3, an example in which the node ND0 and the node ND1 are alternately assigned for each region of 4 gigabytes (GB) is illustrated. In the address decoder table 22, each of the memories MEM00, MEM01, and MEM02 illustrated in FIG. 1 is assigned to three entries indicating assignment of the node ND0. Similarly, in the address decoder table 22, each of the memories MEM10, MEM11, and MEM12 illustrated in FIG. 1 is assigned to three entries indicating assignment of the node ND1. The address decoder table 22 is an example of a table storage section storing the identification information NDID corresponding to each range of the physical address PA of the memory MEM.

FIG. 4 illustrates another example of an address decoder table 22 illustrated in FIG. 2. The address decoder table 22 illustrated in FIG. 4 has a plurality of regions (each row of the address decoder table 22 illustrated in FIG. 4) storing the number of each block, a VALID flag, and the identification information NDID. That is, the address decoder table 22 stores a plurality of entries including the number of each block, the VALID flag, and the identification information NDID. The assignment of an address space of the information processing apparatus IPE illustrated on a right side of FIG. 4 is the same as that of FIG. 3.

For example, each block that is identified by the number of each block corresponds to an address region of 64 megabytes (MB) and an address region of 4 gigabytes (GB) is indicated by 64 blocks. Moreover, the number of entries is decreased as a size of the address region corresponding to the block is increased.

Figure 5:
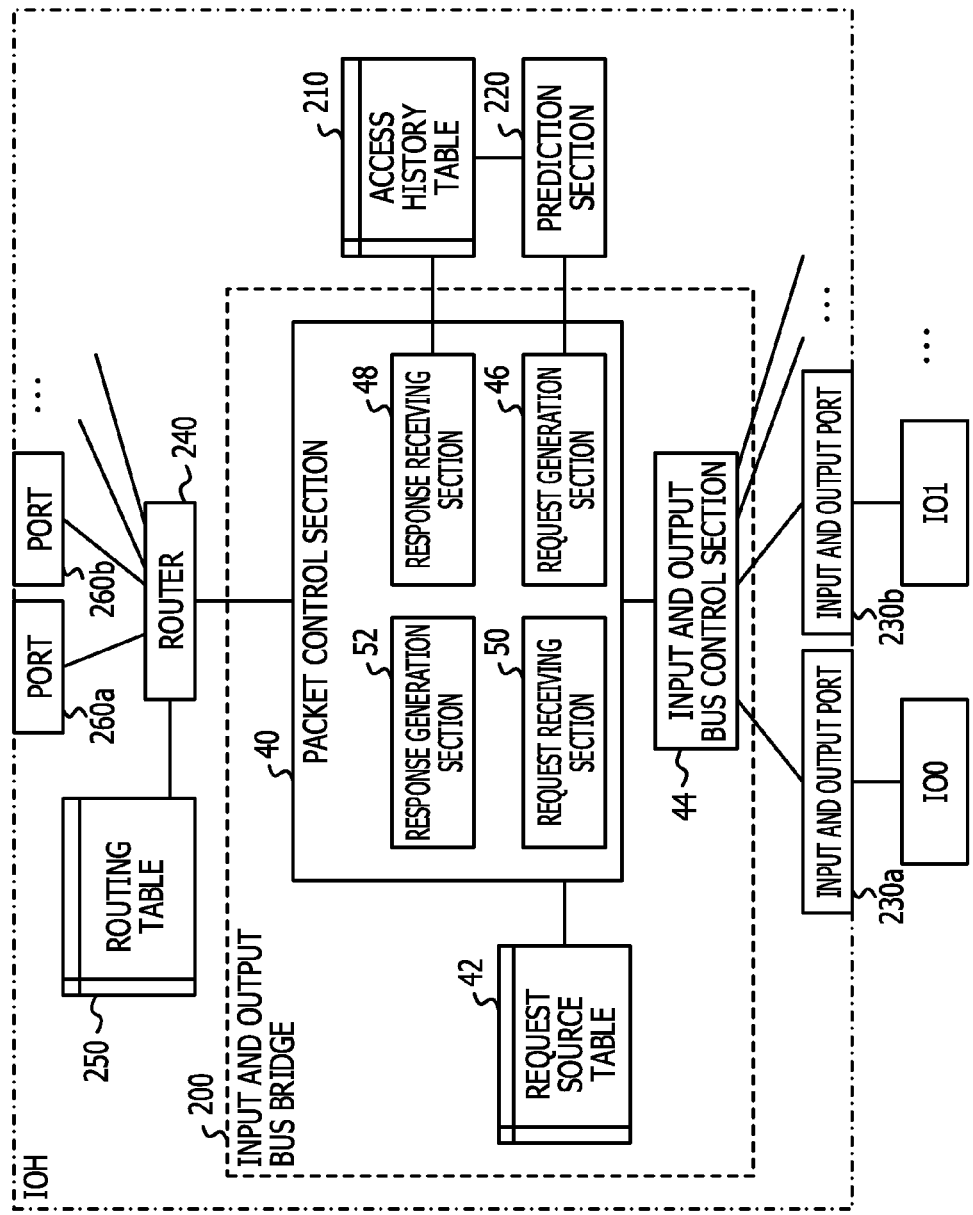
FIG. 5 illustrates an example of the input and output control device illustrated in FIG. 1.

FIG. 5 illustrates an example of the input and output control device IOH illustrated in FIG. 1. The input and output control device IOH has an input and output bus bridge 200, an access history table 210, a prediction section 220, and a plurality of input and output ports 230 (230a, 230b, . . . ). The input and output ports 230a and 230b are respectively coupled to an input and output devices IO0 and IO1. Furthermore, the input and output control device IOH has a router 240, a routing table 250, and a plurality of ports 260 (260a, 260b, . . . ). The ports 260a and 260b are respectively coupled to the nodes ND0 and ND1 through the interconnect ICNT illustrated in FIG. 1.

The input and output bus bridge 200 has a packet control section 40, a request source table 42, and an input and output bus control section 44. The packet control section 40 has a request generation section 46, a response receiving section 48, a request receiving section 50, and a response generation section 52.

The request generation section 46 generates the packet based on the memory access request to the memory MEM transmitted from the input and output device IO through the input and output port 230 and the input and output bus control section 44, and outputs the generated packet to the router 240. At this time, the request generation section 46 passes the number of each input and output device IO issuing the memory access request to the prediction section 220 and predicts the node ND (identification information NDID) outputting the memory access request to the prediction section 220. The request generation section 46 is an example of a generation section that generates the packet based on the identification information NDID predicted by the prediction section 220.

Figure 8:
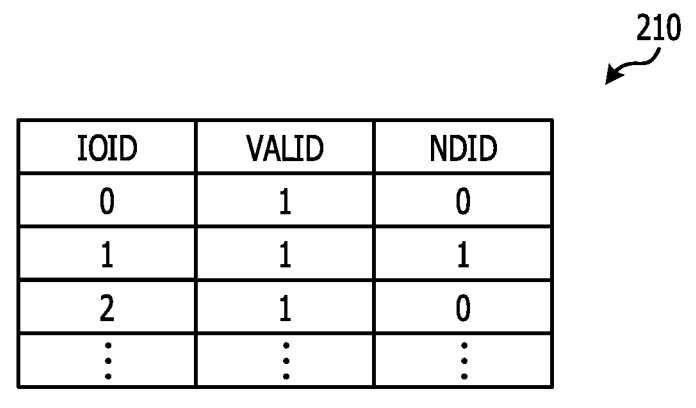

The prediction section 220 refers to the access history table 210 and predicts the node ND outputting the memory access request based on the identification information that identifies the input and output device IO received from the request generation section 46. An example of the access history table 210 is illustrated in FIG. 8. The prediction section 220 is an example of a prediction section that searches for the identification information of the node ND corresponding to the identification information of the input and output device IO that performs a memory access from the access history table 210 and predicts the identification information of the searched node as the identification information of the memory access destination.

Figure 7:
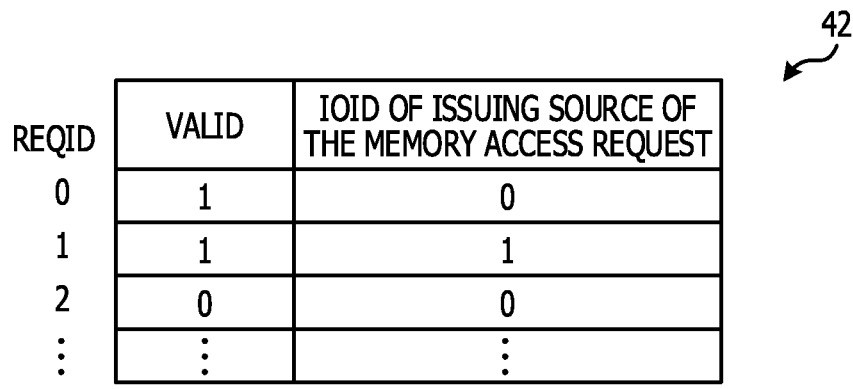
FIG. 7 illustrates an example of a request source table illustrated in FIG. 5.

The response receiving section 48 receives the identification information that indicates the response packet with respect to the packet output by the request generation section 46 and the node ND of the transmission source of the response packet from the router 240. The response receiving section 48 refers to the request source table 42 and obtains the input and output device IO that outputs an original memory access request corresponding to the response packet. Then, the response receiving section 48 outputs the information included in response packet together with the identification information that indicates the obtained input and output device IO to the input and output bus control section 44. Furthermore, the response receiving section 48 writes the identification information to the access history table 210, which indicates the node ND of the transmission source of the response packet corresponding to the input and output device IO outputting the original memory access request of corresponding to the response packet. The response receiving section 48 is an example of a response section storing the identification information NDID obtained by the router 240 to the access history table 210. An example of the request source table 42 is illustrated in FIG. 7.

The request receiving section 50 receives the packet from the nodes ND0 and ND1 that are supplied through the router 240 and outputs the information included in the received packet to the input and output bus control section 44. In a case of the store request in which the data is written by the packet on one of the input and output devices IO, the packet includes the information specifying the input and output device IO writing the data, the write request, and the writing data. In a case of the load request in which the packet reads the data from one of the input and output devices IO, the packet includes information specifying the input and output device IO that reads the data and the read request.

The response generation section 52 generates the response packet with respect to the packet of the store request or the load request accessing to the input and output device IO. The response generation section 52 outputs the generated response packet to the node ND that issues the packet of the packet of the store request or the load request through the router 240. If the packet is a response with respect to the store request in which the data is written on one of the input and output devices IO, the packet includes information indicating that the writing of the data on the input and output devices IO succeeds. In a case of a response with respect to the load request that reads the data from one of the input and output devices IO, the packet includes the information that the reading of the data from the input and output device IO succeeds and load data.

The input and output bus control section 44 outputs the memory access request received from the input and output device IO through the input and output port 230 to the request generation section 46. The input and output bus control section 44 outputs the information included in the response packet received from the response receiving section 48 corresponding to the memory access request to the input and output device IO of an issuing source of the memory access request. The input and output bus control section 44 outputs the access request to the input and output device IO received from the request receiving section 50 to one of the input and output devices IO. The input and output bus control section 44 outputs the information output from the input and output device IO corresponding to the access request to the input and output device IO to the response generation section 52.

The router 240 refers to the routing table 250, obtains the port 260 coupled to the node ND that outputs the packet, and outputs the packet to the obtained port 260 if the packet is received from the request generation section 46 or the response generation section 52. Furthermore, the router 240 outputs the packet received from the node ND through one of the ports 260 to the response receiving section 48 or the request receiving section 50. The router 240 refers to the routing table 250, obtains the node ND coupled to the port 260 that receives the packet, and outputs the identification information that identifies the obtained node ND to the packet control section 40 together with the packet. The router 240 is an example of a transmitting and receiving section that outputs the packet generated by the request generation section 46. An example of the routing table 250 is illustrated in FIG. 6.

FIG. 6 illustrates an example of the routing table 250 illustrated in FIG. 5. The routing table 250 has a plurality of regions (each row of the routing table 250 illustrated in FIG. 6) storing the identification information NDID that identifies the node ND, the VALID flag, and port information PTID that indicates the number of each port to which the node ND is coupled. The plurality of regions are respectively provided corresponding to the node ND included in the information processing apparatus IPE. Then, the routing table 250 stores the entry including the identification information NDID, the VALID flag, and the port information PTID for each node ND.

Moreover, a region of the identification information NDID=5 corresponding to the input and output control device IOH is invalid (VALID flag="0") and "5" of the port information PTID is a dummy value.

The routing table 250 is an example of a coupling table storage section that stores correspondence between the identification information NDID that identifies the plurality of nodes ND coupled to the plurality of ports 260 and the plurality of ports 260. Moreover, the number of regions included in the routing table 250 is not limited to 64.

"1" of the VALID flag indicates that the entry is valid and "0" of the VALID flag indicates that the entry is invalid. In the example illustrated in FIG. 6, as illustrated in brackets on a left side of the routing table 250, "0" to "4" of the identification information NDID respectively indicate the node ND0 to the node ND4. "0" to "4" of the port information PTID indicate the ports 260 respectively coupled to the node ND0 to the node ND4.

The router 240 illustrated in FIG. 5 refers to the routing table 250, obtains the port information PTID corresponding to the node ND of the transmission destination included in the packet, and transmits the packet to the port 260 indicated by the obtained port information PTID if the packet is received from the packet control section 40. Furthermore, the router 240 refers to the routing table 250 and obtains the identification information NDID corresponding to the port information PTID that indicates the port 260 transmitting the packet if the packet is received through one of the ports 260. Then, the router 240 outputs the identification information NDID that indicates the node ND of the transmission source of the packet to the packet control section 40 together with the received packet.

FIG. 7 illustrates an example of the request source table 42 illustrated in FIG. 5. The request source table 42 has a plurality of regions (each row of the request source table 42 illustrated in FIG. 7) storing the VALID flag and identification information IOID that identifies the input and output device IO of the issuing source of the memory access request corresponding to identification information REQID. That is, the request source table 42 has the region storing the entry including the VALID flag and the identification information IOID for each kind of identification information REQID.

"1" of the VALID flag indicates that the entry is valid and "0" of the VALID flag indicates that the entry is invalid. The request source table 42 is an example of a request table storage section storing the entry including the identification information IOID that identifies the input and output device IO issuing the memory access request to the memory MEM for each packet.

The request generation section 46 illustrated in FIG. 5 stores the identification information IOID in the entry of an invalid state of the request source table 42 and sets the VALID flag to be "1" when the packet based on the memory access request from the input and output device IO is transmitted to the node ND. Furthermore, the response receiving section 48 illustrated in FIG. 5 refers to the request source table 42 and obtains the identification information IOID included in the entry corresponding to the identification information REQID included in the response packet when receiving the response packet. Then, the response receiving section 48 notifies the obtained identification information IOID to the input and output bus control section 44 together with the information included in the response packet. Here, the identification information IOID that is obtained by referring to the request source table 42 by the response receiving section 48 indicates the input and output device IO that outputs the source memory access request corresponding to the response packet.

FIG. 8 illustrates an example of the access history table 210 illustrated in FIG. 5. The access history table 210 has a plurality of regions (each row of the access history table 210 illustrated in FIG. 8) respectively corresponding to the input and output device IO included in the information processing apparatus IPE. Each region stores the identification information IOID that identifies the input and output device IO, the VALID flag, the transmission destination of the memory access request, and the identification information NDID that indicates the predicted node ND. That is, the access history table 210 stores a plurality of entries including the identification information IOID, the VALID flag and the identification information NDID. The number of entries stored in the access history table 210 is equal to the number of the input and output devices IO (that is, the number of the input and output ports 230 of FIG. 5) capable of being coupled to the input and output control device IOH.

"1" of the VALID flag indicates that the identification information NDID included in the entry is valid (that is, capable of being used to predict the transmission destination of the memory access request) and "0" of the VALID flag indicates that the identification information NDID included in the entry is invalid. The access history table 210 is referred to by the prediction section 220 illustrated in FIG. 5 and is updated by the response receiving section 48 illustrated in FIG. 5. An example for updating the access history table 210 is illustrated in FIG. 13.

The access history table 210 is an example of a history storage section that stores the entry in which the identification information IOID specifying the input and output device IO to which one of the nodes ND accessed in the past corresponds to the identification information NDID that indicates the node ND that is the transmission source of the response packet.

The access history table 210 illustrated in FIG. 8 has a scale smaller than that of the address decoder table 22 illustrated in FIG. 3. Furthermore, the source address decoder 20 and the prediction section 220 have substantially the same scale as each other. Thus, a circuit scale of the input and output control device IOH on which the prediction section 220 and the access history table 210 are mounted may be decreased compared to a circuit scale of the input and output control device IOH on which the source address decoder 20 and the address decoder table 22 are mounted.

FIG. 9 illustrates an example of the packet interchanged between the node ND and the input and output control device IOH through the interconnect ICNT illustrated in FIG. 1. Moreover, the number of bits and bytes (illustrated in square brackets in FIG. 9) of each element included in the packet is not limited to values illustrated in FIG. 9. FIG. 9 illustrates the store request for writing data, the store response that is the response packet corresponding to the store request, the load request for reading data, and the load response that is the response packet with respect to the load request as an example of the packet.

In each packet, an operation code OPCD indicates a type (any of the store request, the store response with respect to the store request, the load request, and the load response with respect to the load request) of the packet. A destination DST indicates the identification information (NDID or IOID) of the transmission destination of the packet and a source SRC indicates the identification information (IOID or NDID) of the transmission source of the packet. The identification information REQID indicates the identification information REQID that is assigned to the request source table 42 when transmitting the request from the input and output control device IOH. The identification information REQID is used for identifying the input and output device IO issuing the memory access request to the memory MEM. The physical address PA indicates the address of an access target in the request accessing to the memory MEM and indicates the address assigned to the input and output control device IOH in the request accessing to the input and output control device IOH.

The packet of the store request includes data DATA that is written on the memory MEM of the access target or the input and output control device IOH and the packet of the load response includes the data DATA that is written from the memory MEM of the access target or the input and output control device IOH. The packets of the store response and the load response include a result code RESULT indicating a result of an access operation by a source packet for the corresponding request. "(RSV)" in each packet indicates that it is not used.

Figure 10:
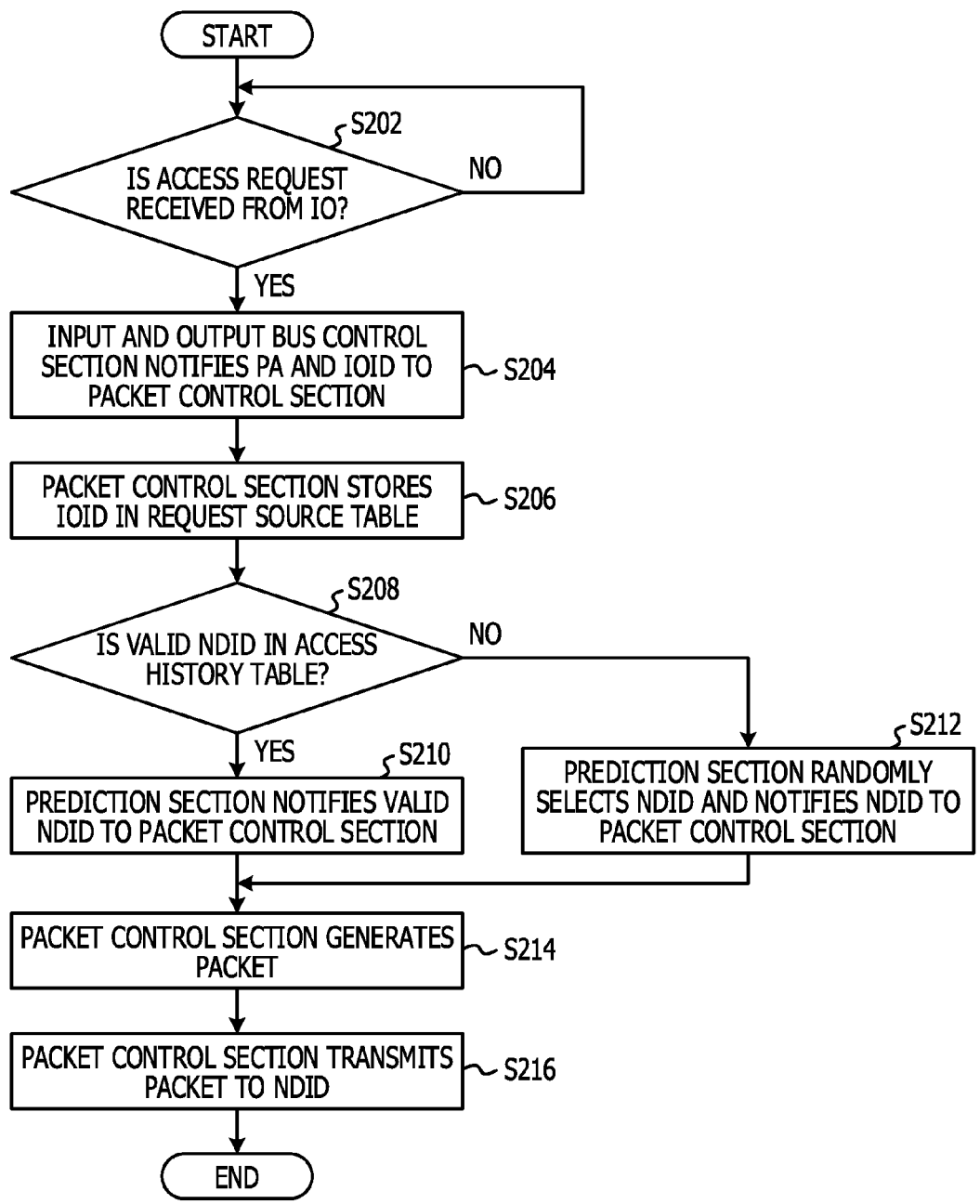
FIG. 10 illustrates an example of an operation in which the input and output control device illustrated in FIG. 5 transmits a packet of a store request or a load request to a node.
Figure 11:
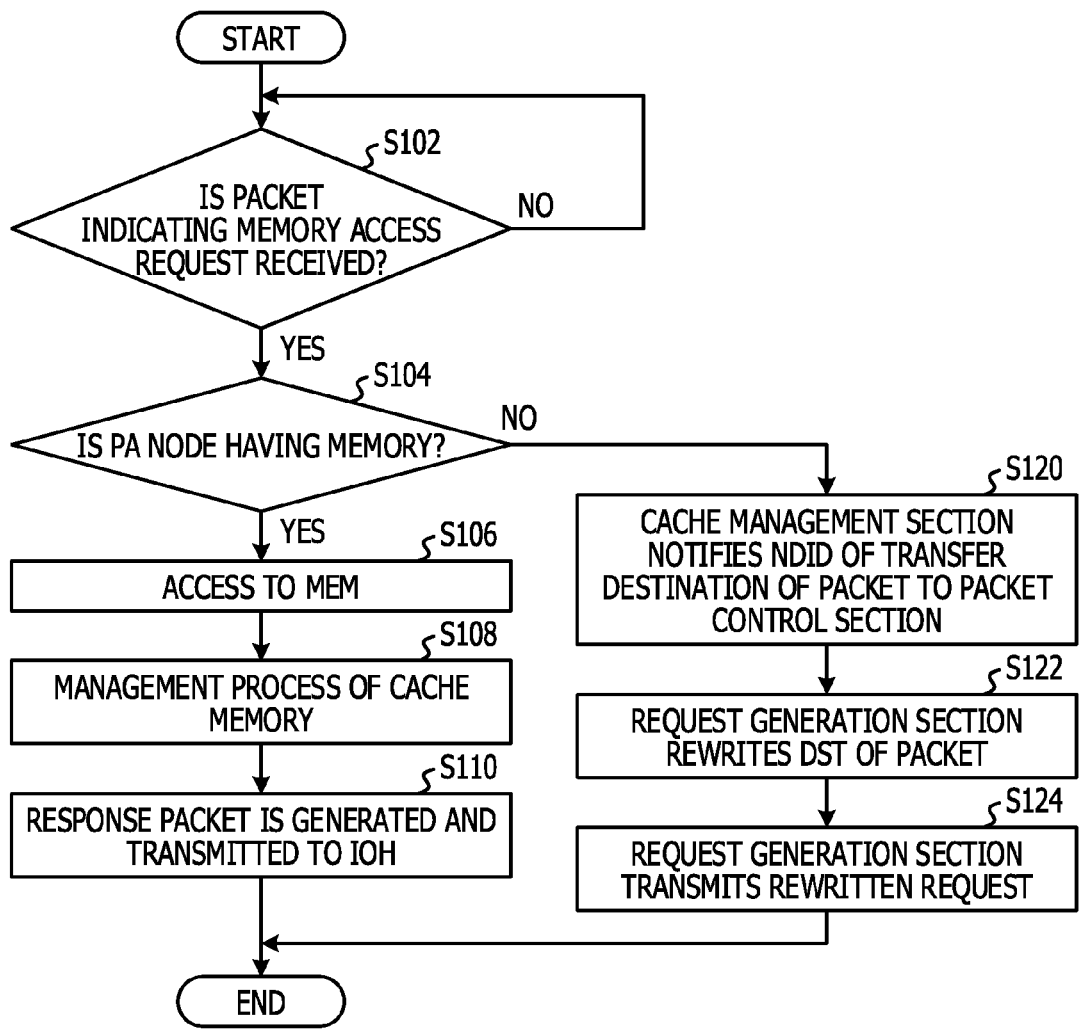
FIG. 11 illustrates an example of an operation if the node illustrated in FIG. 2 receives the packet of the store request or the load request from the input and output control device.
Figure 12:
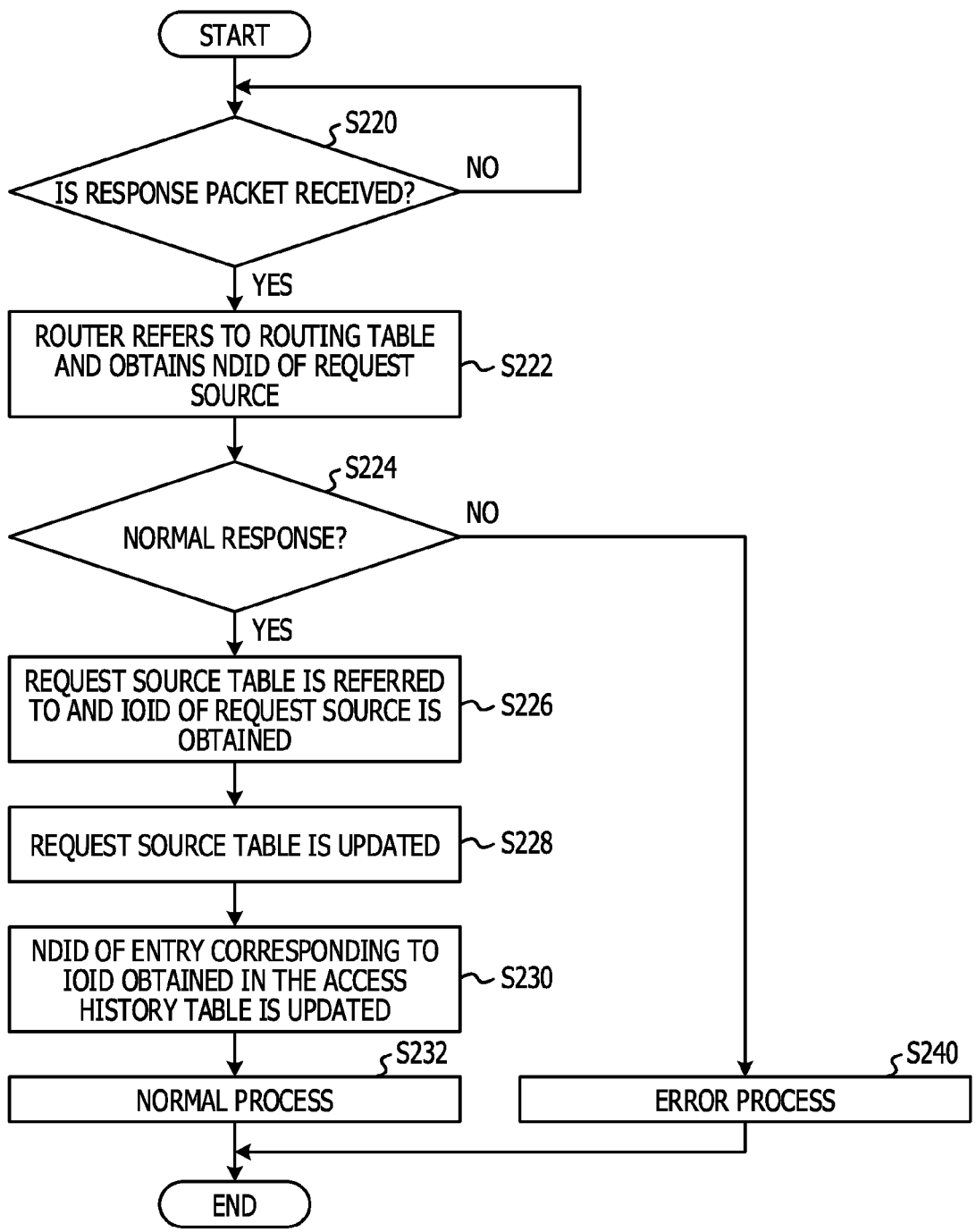
FIG. 12 illustrates an example of an operation if the input and output control device illustrated in FIG. 5 receives a response packet from the node.

FIGS. 10 to 12 illustrate examples of an operation in which the input and output device IO illustrated in FIG. 1 accesses the memory MEM. FIGS. 10 to 12 illustrate examples of a control method of the information processing apparatus IPE. FIGS. 10 to 12 illustrate operations of the input and output control device IOH in which the memory access request for writing the data on the memory MEM is received from the input and output device IO and the data is written on the memory MEM. Otherwise, FIGS. 10 to 12 illustrate operations of the input and output control device IOH in which the data read from the memory MEM is transmitted to the input and output device IO after the memory access request with respect to the memory MEM is received from the input and output device IO.

FIG. 10 illustrates an example of the operation in which the input and output control device IOH illustrated in FIG. 5 transmits the packet of the store request or the load request to the node ND.

First, in step S202, the input and output bus control section 44 executes a process of step S204 if the memory access request to the memory MEM is received from the input and output device IO.

In step S204, the input and output bus control section 44 notifies the physical address PA included in the memory access request and the identification information IOID that identifies the input and output device IO issuing the memory access request to the packet control section 24.

Next, in step S206, the packet control section 24 stores the identification information IOID received from the input and output bus control section 44 in one invalid entry (entry in which the valid flag is "0") inside the request source table 42 and sets the VALID flag to be "1". Furthermore, the packet control section 24 notifies the identification information IOID received from the input and output bus control section 44 to the prediction section 220.

Next, in step S208, the prediction section 220 refers to the access history table 210 and determines whether the entry corresponding to the identification information IOID received from the packet control section 24 includes the valid identification information NDID. The prediction section 220 determines whether the entry corresponding to the identification information IOID includes the valid identification information NDID by using the VALID flag.

The prediction section 220 notifies the identification information NDID to the packet control section 24 in step S210 if the entry corresponding to the identification information IOID includes the valid identification information NDID.

The prediction section 220 randomly predicts one kind of identification information NDID that identifies the node ND coupled to the interconnect ICNT in step S212 if the entry corresponding to the identification information IOID does not include the valid identification information NDID. Then, the prediction section 220 notifies the identification information NDID that is randomly predicted to the packet control section 24. Moreover, the prediction section 220 may predict the identification information NDID according to a predetermined rule other than random if the access history table 210 does not store the valid identification information NDID. The predetermined rule other than random is an ascending order, a descending order, and the like.

As described above, if the valid identification information NDID is not stored in the access history table 210, the prediction section 220 selects the identification information NDID according to the predetermined rule. Thus, even if the valid identification information NDID is not stored in the access history table 210, the request generation section 46 generates the packet based on the memory access request from the input and output device IO and may transmit the packet to one of the nodes ND. In other words, if the valid identification information NDID is not stored in the access history table 210, it is possible to suppress an erroneous operation of the request generation section 46. Moreover, as described below using FIG. 11, even if the node ND of the transmission destination of the packet, which is transmitted as described above, is not the correct destination, since the packet is transferred to a correct node ND, a transmission error of the packet is suppressed.

Next, in step S214, the packet control section 40 generates the packet in which the identification information NDID received from the prediction section 220 is set to the transmission destination (destination DST) based on the memory access request received from the input and output bus control section 44. The source SRC of the packet sets the memory access request to the identification information IOID of the input and output device IO that is issued. The generated packet includes the identification information REQID assigned to a region storing the identification information IOID in the request source table 42.

As described above, the input and output control device IOH may determine the node ND transmitting the packet based on a prediction result of the prediction section 220 without having the source address decoder 20 and the address decoder table 22. As a result, even if a new CPU is developed, it is possible to use the existing input and output control device IOH without having the source address decoder and the address decoder table mounted on the new CPU. Thus, it is possible to couple the existing input and output device IO, which is guaranteed in a coupling property to the input and output control device IOH, to the information processing apparatus IPE. That is, it is possible to couple the input and output control device IOH to the node ND without depending on the generation of the CPU and it is possible to transmit and receive the packet without decreasing the coupling property between the input and output control device IOH the node ND even if the new CPU is developed.

Next, in step S216, the packet control section 24 transmits the generated packet to the router 240. The router 240 refers to the routing table 250 and outputs the packet to the port 260 to which the node ND is coupled, the node ND being indicated by the identification information NDID that is set to the source SRC of the packet.

FIG. 11 illustrates an example of an operation if the node ND illustrated in FIG. 2 receives the packet of the store request or the load request from the input and output control device IOH.

First, in step S102, the CPU executes the process of step S104 if the packet control section 24 receives the packet indicating the memory access request to the memory MEM. Moreover, step S102 is executed if the packet control section 24 receives the packet indicating the memory access request from the input and output control device IOH or the other node ND.

In step S104, the cache management section 14 passes the physical address PA included in the packet received from the packet control section 24 to the source address decoder 20. The source address decoder 20 refers to the address decoder table 22 and obtains the identification information NDID that indicates the node ND in which the physical address PA is assigned. Moreover, the address decoder table 22 referred to by the source address decoder 20 may be one of table configurations illustrated in FIGS. 3 and 4.

Then, the cache management section 14 determines whether the identification information NDID which is obtained by the source address decoder 20 indicates the node having the memories MEM00, MEM01, and MEM02. If the physical address PA indicates the node having the memories MEM00, MEM01, and MEM02, step S106 is executed. If the identification information NDID indicates the other nodes, step S120 is executed to transfer the packet to the other node.

In step S106, the cache management section 14 accesses the region of the cache memory 16 indicated by the physical address PA or the memory MEM indicated by the physical address PA and writes the data if the packet is the store request. Meanwhile, the cache management section 14 accesses the region of the cache memory 16 indicated by the physical address PA or the memory MEM indicated by the physical address PA and reads the data if the packet is the load request. Next, in step S108, the cache management section 14 executes a management process in which coherence of the cache memory 16 is maintained and the like. Furthermore, the cache management section 14 outputs a notification of completion of the memory access to the packet control section 24 and if the packet is the load request, outputs the data read from the cache memory 16 or the memory MEM to the packet control section 24.

Next, in step S110, the response generation section 32 of the packet control section 24 generates the response packet with respect to the memory access, transmits the generated packet to the input and output control device IOH, and the operation is finished.

Meanwhile, in step S120, the cache management section 14 notifies the identification information NDID obtained in step S104 to the packet control section 24 as the transfer destination of the packet. Next, in step S122, the request generation section 26 of the packet control section 24 rewrites the identification information NDID stored in the destination DST of the packet with the identification information NDID received from the cache management section 14. Next, in step S124, the request generation section 26 transmits the packet in which the destination DST is rewritten to the router 110. The router 110 transfers the packet to the other node ND based on the received packet. Then, the receiving operation of the packet is completed. The CPU of the other node ND receiving the transferred packet executes the process of steps S102, S104, S106, S108, and S110.

Moreover, if the cache management section 14 does not have a transfer function of the packet, an error process is executed instead of steps S120, S122, and S124. In the error process, the cache management section 14 outputs an instruction to transmit the response packet including the result code RESULT indicating "PA abnormality" to the input and output control device IOH to the response generation section 32. If the input and output control device IOH receives the response packet including the result code RESULT indicating "PA abnormality", the process of steps S202, S204, S208, S212, S214, and S216 illustrated in FIG. 10 is executed and the packet is retransmitted to the other node ND. Thus, the input and output control device IOH may transmit the packet to the correct node ND by repeating the error process and the retransmission of the error process several times. If the memory access request (packet) from the input and output device IO to the memory MEM is continuously issued for a predetermined number of times, the following packet is transmitted to the correct node ND. As described above, even if the node ND of the transmission destination of the packet that is predicted by the prediction section 220 is incorrect and the CPU does not have the transfer function of the packet, the information processing apparatus IPE may process the packet based on the memory access request.

FIG. 12 illustrates an example of an operation if the input and output control device IOH illustrated in FIG. 5 receives the response packet from the node ND. The response packet is the store response or the load response illustrated in FIG. 9.

First, in step S220, the input and output control device IOH illustrated in FIG. 5 executes the process of step S222 if the response packet is received from the CPU through the router 240.

In step S222, the router 240 refers to the routing table 250, obtains the identification information NDID that indicates the node ND coupled to the port 260 receiving the response packet, and outputs the obtained identification information NDID to the packet control section 40 together with the response packet. That is, the router 240 searches the routing table 250 and obtains node identification information NDID that indicates the node ND of the transmission source of the response packet if the response packet is received from one of the plurality of nodes ND.

As described above, the router 240 may obtain the identification information NDID stored in the access history table 210 in step S230 by obtaining the node ND of the transmission source of the response packet referring to the existing routing table 250. That is, it is possible to obtain the identification information NDID that indicates the node ND of the transmission source of the response packet without providing a new circuit.

Next, in step S224, the response receiving section 48 of the packet control section 40 refers to the result code RESULT (FIG. 9) included in the response packet and determines whether the process of an original packet for the corresponding request is normal. If the result code RESULT indicates the normal response, the process of step S226 is executed and if the result code RESULT indicates abnormality of the identification information NDID or abnormality of the physical address PA, the process of step S240 is executed.

In step S226, the response receiving section 48 refers to the request source table 42 (FIG. 7) and obtains the identification information IOID of the issuing source of the memory access request stored in a region corresponding to the identification information REQID included in the response packet. That is, the response receiving section 48 searches the request source table 42 and obtains the identification information IOID of the input and output device IO corresponding to the identification information REQID included in the packet received from one of the plurality of nodes ND.

NEXT, in step S228, the response receiving section 48 set the VALID flag of a region in which the identification information IOID is obtained to be "0" and returns the identification information REQID corresponding to the region to an unused state in the request source table 42. That is, the request source table 42 is updated.

Next, in step S230, the response receiving section 48 stores the identification information NDID of the transmission source of the response packet obtained in step S222 to the entry of the access history table 210 corresponding to the identification information IOID obtained in step S226. The node ND of the transmission source of the response packet is the node ND in which the original packet (memory access request) corresponding to the response packet is processed. That is, the response receiving section 48 stores the identification information NDID that indicates the node ND including the memory MEM accessing the original packet corresponding to the response packet to the access history table 210.

As described above, the response receiving section 48 may update the identification information NDID of the access history table 210 by using the identification information IOID of the issuing source of the memory access request specified from the request source table 42. That is, it is possible to select the entry storing the identification information NDID in the access history table 210 by using the existing request source table 42 without providing a new circuit.

In step S104 of FIG. 11, if it is determined that the physical address PA in the packet is the other node, the identification information NDID that is indicated by the destination DST in the packet is incorrect as the destination of the packet. In other words, the identification information NDID obtained by using the access history table 210 by the prediction section 220 when generating the packet, or the identification information NDID that is randomly generated, is incorrect as the destination of the packet. Meanwhile, the response receiving section 48 stores the identification information NDID in the access history table 210 whenever receiving the response packet. Thus, if the memory access request (packet) from the input and output device IO to the memory MEM is continuously issued a predetermined number of times, a probability that the identification information NDID predicted by the prediction section 220 is correct is increased.

Next, in step S232, the response receiving section 48 executes a normal process on the response packet. If the original packet of the response packet is the store request, the response receiving section 48 notifies the completion of the writing of the data to the input and output device IO of the issuing source of the memory access request corresponding to the original packet. If the original packet of the response packet is the load request, the response receiving section 48 transfers the data read from the memory MEM to the input and output device IO of the issuing source of the memory access request corresponding to the original packet. Then, a receiving process of the response packet by the input and output device IO is finished. Moreover, the input and output device IO of the issuing source of the memory access request is indicated as the identification information IOID obtained from the request source table 42 in step S226.

Meanwhile, if the result code RESULT indicates the abnormality of the identification information NDID or the abnormality of the physical address PA, in step S240, the response receiving section 48 executes the error process. The response receiving section 48 notifies the information that indicates a failure of memory access to the memory MEM to the input and output device IO of the issuing source of the memory access request. Then, the receiving process of the response packet by the input and output control device IOH is finished.

The correct identification information NDID stored in the access history table 210 by the process of step S230 is used in the process of step S210 of FIG. 10 if next memory access request is issued from the input and output device IO. In the packet illustrated in FIG. 9, the data of 128 bytes is written on the memory MEM by one store request and the data of 128 bytes is read from the memory MEM by one load request. For example, the memory accessing to the memory MEM by the input and output device IO is executed by page unit and one page is 8 kilobytes (KB). In this case, the writing of the data from the input and output device IO to the memory MEM is executed by the store request of 64 times and the reading of the data from the memory MEM to the input and output device IO is executed by the load request of 64 times.

In the memory access request of 64 times accessing to one page of the memory MEM, the identification information NDID that is predicted by the prediction section 220 based on an initial memory access request is incorrect (the prediction section 220 executes step S212 of FIG. 10). Even in this case, the identification information NDID that indicates the memory access destination is correctly set in the access history table 210 and the packet corresponding to the memory access request of a second and subsequent is transmitted to the correct node ND based on receiving of the response packet with respect to the initial memory access request.

FIG. 13 illustrates an example of updating the access history table 210 illustrated in FIG. 8. Moreover, FIG. 13 illustrates the entry corresponding to the input and output devices IO0 and IO1. Furthermore, FIG. 13 illustrates an example of the control method of the information processing apparatus IPE. All entries of the access history table 210 are set to an initial state by an initialization process after power supply is input into the information processing apparatus IPE ((a) in FIG. 13). In the initial state, the region of the identification information IOID is sequentially stored from "0" of the number designated to each of the input and output devices IO and all regions of the VALID flag and all regions of the identification information NDID are set to be "0".

Thereafter, the input and output control device IOH receives the memory access request from the input and output device IO1 to which the identification information IOID of "1" is designated. The entry including the identification information IOID="1" in the access history table 210 is in the invalid state in which the VALID flag is "0". Thus, as described in step S212 of FIG. 10, the input and output control device IOH generates the packet (store request or load request) by using the random identification information NDID that is predicted by the prediction section 220.

The response receiving section 48 of the input and output control device IOH receives the response packet (store response or load response) with respect to the packet of the memory access request issued by the input and output device IO1 from the node ND1 to which the identification information NDID="1" is designated ((b) in FIG. 13). Then, as described in step S230 of FIG. 12, the response receiving section 48 sets respectively the regions of the VALID flag of the entry including the identification information IOID="1" and the identification information NDID in the access history table 210 to be "1" ((c) in FIG. 13).

Next, the input and output control device IOH receives the memory access request from the input and output device IO1 to which the identification information IOID of "1" is designated. As described in step S210 of FIG. 10, the input and output control device IOH generates the packet by using the identification information NDID (="1") that is predicted by referring to the access history table 210 by the prediction section 220.

Thereafter, the response receiving section 48 receives the response packet from the node ND1 to which the identification information NDID="1" is designated ((d) in FIG. 13). Then, as described in step S230 of FIG. 12, the response receiving section 48 respectively sets the regions of the VALID flag of the entry including the identification information IOID="1" and the identification information NDID in the access history table 210 to be "1" ((e) in FIG. 13). Moreover, if a plurality of memory access requests are continuously issued from one input and output device IO to one memory MEM, contents of the access history table 210 updated based on the response packet are the same as those of the state before the update. If the contents of the access history table 210 are not changed before and after the update, the response receiving section 48 may omit a rewriting process of the regions of the VALID flag and the identification information NDID of the access history table 210.

Next, the input and output control device IOH receives the memory access request from the input and output device IOU to which the identification information IOID="0" is designated. The entry including the identification information IOID="0" in the access history table 210 is in the invalid state in which the VALID flag is "0". Thus, as described in step S212 of FIG. 10, the input and output control device IOH generates the packet by using the random identification information NDID generated by the prediction section 220.

Thereafter, the response receiving section 48 receives the response packet from the node ND0 to which the identification information NDID"0" is designated ((f) in FIG. 13). Then, as described in step S230 of FIG. 12, the response receiving section 48 respectively sets the regions of the VALID flag of the entry including the identification information IOID="0" and the identification information NDID in the access history table 210 to be "1" ((g) in FIG. 13).

Figure 14:
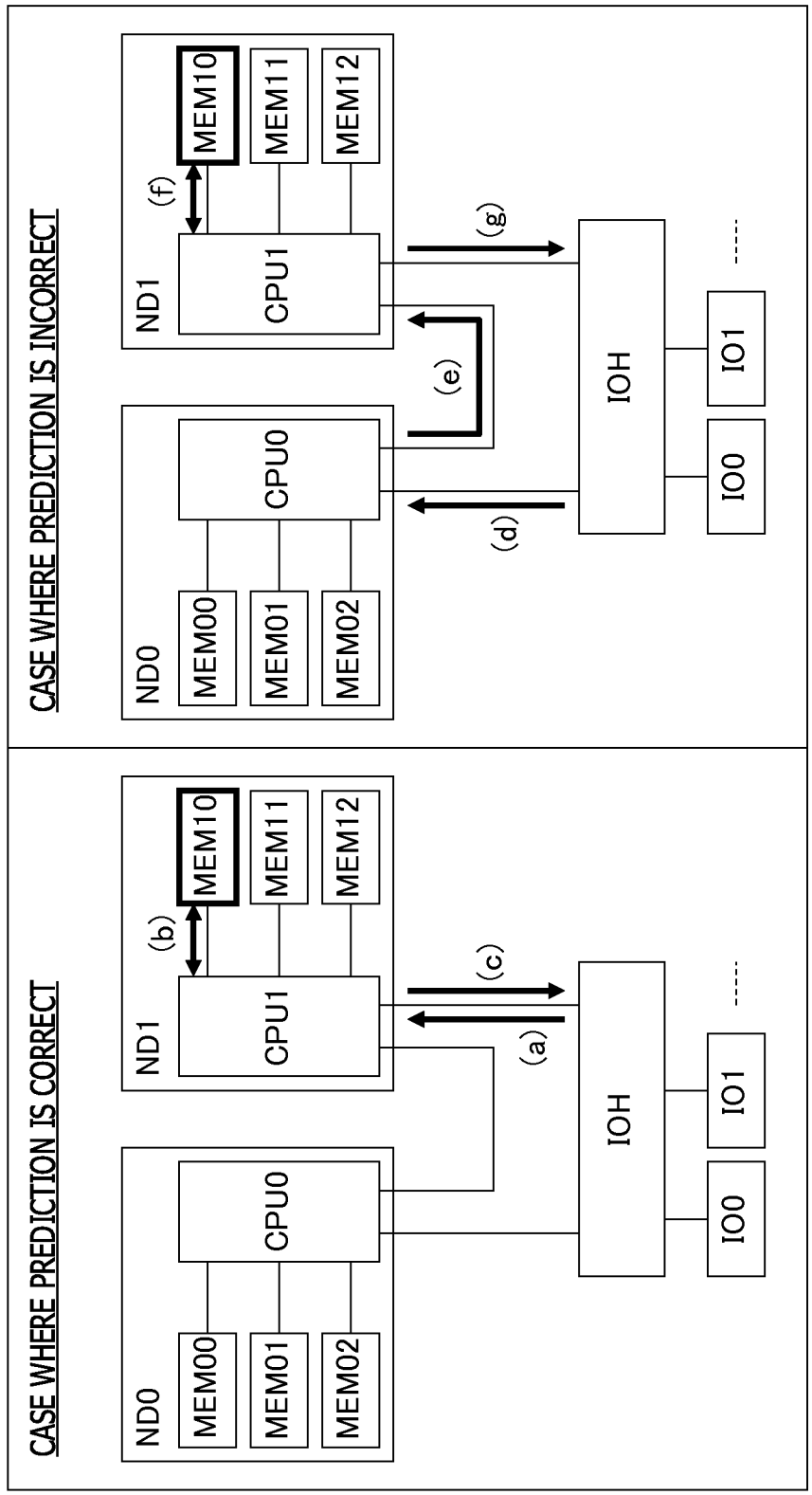
FIG. 14 illustrates an example of a flow of the packet if a prediction of a prediction section is correct and if the prediction of the prediction section is incorrect.

FIG. 14 illustrates an example of a flow of the packet when the prediction of the prediction section 220 is correct and when the prediction of the prediction section 220 is incorrect. FIG. 14 illustrates an example of the control method of the information processing apparatus IPE. In the example illustrated in FIG. 14, the input and output device IO transmits the memory access request to the input and output control device IOH together with the physical address PA that indicates a storage region that is assigned to a memory MEM10 coupled to the CPU1. Then, the memory MEM10 is accessed by the packet issued by the input and output control device IOH based on the memory access request.

If the prediction of the prediction section 220 is correct, the input and output control device IOH transmits the packet to the node ND1 including the memory MEM10 to be accessed ((a)). The CPU1 of the node ND1 accesses the memory MEM10 based on the received packet ((b)). Then, the CPU1 transmits the response packet to the input and output control device IOH ((c)).

Meanwhile, if the prediction of the prediction section 220 is incorrect, the input and output control device IOH transmits the packet to the node ND0 that does not include the memory MEM10 to be accessed ((d)). The CPU0 of the node ND0 detects that the physical address PA included in the packet is designated to the node ND1 by referring to the access history table 210 illustrated in FIG. 5 and transfers the packet to the node ND1 ((e)). The CPU1 of the node ND1 receiving the transferred packet accesses the memory MEM10 based on the packet ((f)). Then, the CPU1 transmits the response packet to the input and output control device IOH ((g)).

FIG. 15 illustrates a comparative example of the access time if the prediction of the prediction section 220 is correct and if the prediction of the prediction section 220 is incorrect. In the example illustrated in FIG. 15, the input and output device IO transmits the memory access request to the input and output control device IOH together with the physical address PA that indicates the storage region assigned to the memory MEM10 included in the node ND1.

If the prediction of the prediction section 220 is correct and the identification information NDID that is predicted by the prediction section 220 indicates the node ND1, the input and output control device IOH transmits the packet to the CPU1 without going through the CPU0. In this case, the transfer of the packet to the CPU0 is not generated.

Meanwhile, the prediction of the prediction section 220 is incorrect and the identification information NDID obtained by the prediction section 220 indicates the node ND0 rather than the node ND1, the transfer of the packet from the CPU0 to the CPU1 is generated. In this case, a time for the transfer of the packet includes a transmission process time of the packet that is transferred by the CPU0 to the CPU1, a transfer time of the packet, and a receiving process time of the packet received by the CPU1. As a result, if the prediction of the prediction section 220 is incorrect, access penalty occurs corresponding to the time according to the transfer of the packet.

Figure 16:
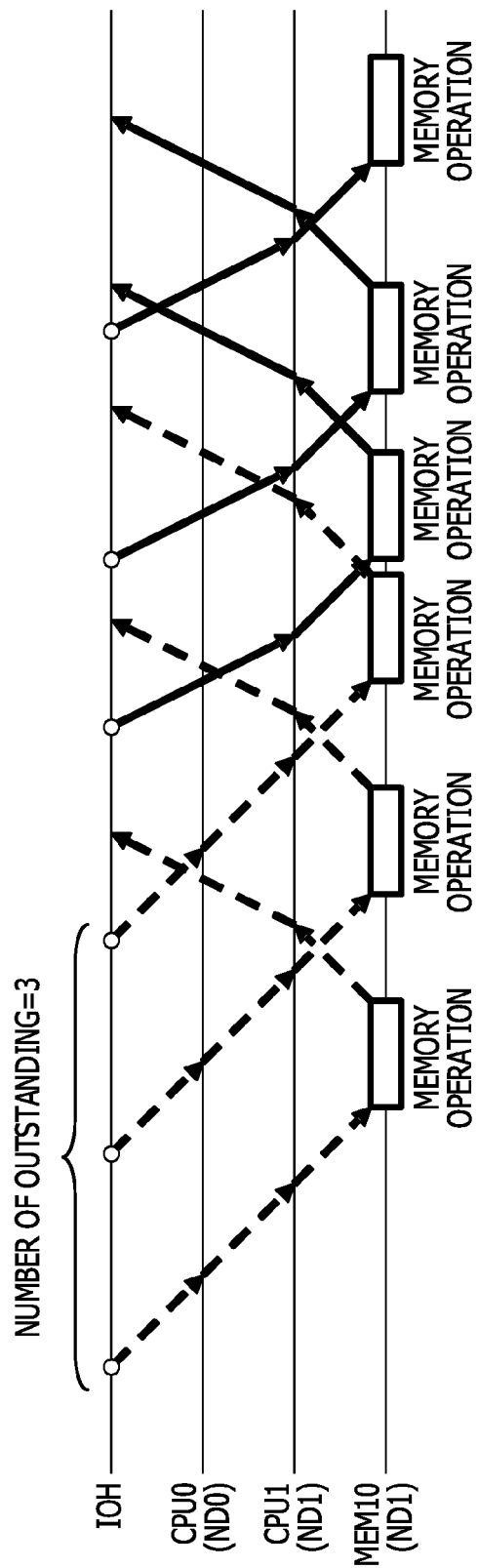
FIG. 16 illustrates an example of an operation of the information processing apparatus if the packet is continuously issued.

FIG. 16 illustrates an example of the operation of the information processing apparatus IPE when the packet is continuously issued. Detailed description of the operation similar to FIG. 15 will be omitted. Similar to FIG. 15, thick dashed arrows illustrate the operation of the case where the prediction of the prediction section 220 is incorrect and thick solid arrows illustrate the operation of the case where the prediction of the prediction section 220 is correct.

In FIG. 16, the number of outstanding that is the number of requests capable of being transmitted before receiving the response to the preceding request is "3". Furthermore, in the packet for the number of the outstanding, the prediction section 220 incorrectly predicts the identification information NDID and in the packet after the number of the outstanding, the prediction section 220 correctly predicts the identification information NDID.

Since the input and output control device IOH does not hold the number of requests waiting for a response exceeding the number of outstanding, a fourth and subsequent packets are transmitted to the CPU0 or the CPU1 after the response packet to the preceding packet is received.

Figure 17:
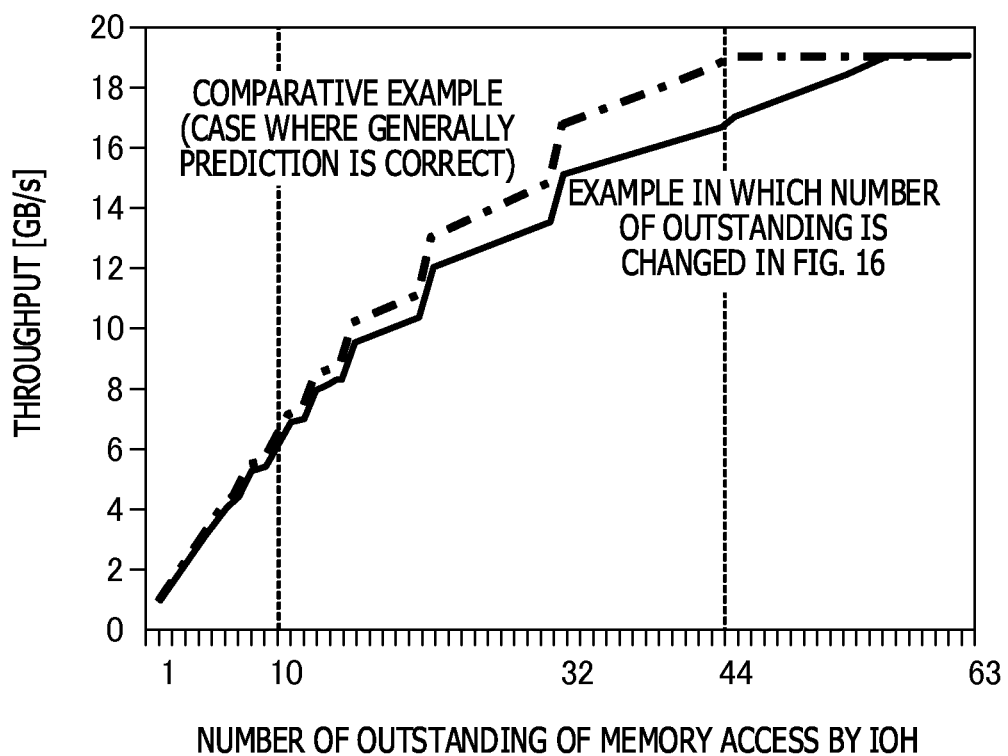
FIG. 17 illustrates an example of a relationship between the number of outstanding and a throughput of data transferred between the input and output control device and a memory.

FIG. 17 illustrates an example of a relationship between the number of outstanding and a throughput of data transferred between the input and output control device IOH and the memory MEM. A thick solid line of FIG. 17 indicates a change of the throughput in a case where the prediction of the identification information NDID is incorrect in the request by the number of outstanding and the prediction of the identification information NDID is correct in the request after the number of outstanding. The throughput in the operation illustrated in FIG. 16 illustrates characteristics of a case where the number of outstanding is "3" in the solid line illustrated in FIG. 17 (appropriately 2 GB/s). Meanwhile, one-dotted chain line of FIG. 17 illustrates a change of the throughput of the case where the prediction of the identification information NDID is correct in all entries.

The characteristics illustrated in FIG. 17 are obtained using the following parameters.

A communication band width of the interconnect ICNT: 36 GB/s
A total transfer amount of the data: 8 KB
A data size transmitted in one packet: 128 B
A delay time by the transmission process of the packet: 21 ns
A delay time by the receiving process of the packet: 19 ns
A delay time by the transfer of the packet: 10 ns
Access latency of the memory MEM: 100 ns 64 packets for transferring the data of 8 KB is issued from the relationship between the total transfer amount of the data and the data size transmitted in one packet. The throughput (GB/s) is obtained by dividing the transfer amount of the data by the transfer time. As illustrated in FIG. 15, the prediction by the prediction section 220 being incorrect appears as an increase (access penalty) in the transfer time. If the prediction by the prediction section 220 is incorrect, the transfer of the packet between the nodes ND is generated and a delay time by the transmission process of the packet, a delay time by the transfer of the packet, and a delay time by the receiving process of the packet are additionally taken (50 ns).

Since the number of the outstanding is the number of the packets that may be transmitted before the response packet is received, transmission efficiency of the packet is improved and the throughput is increased as the number of the outstanding is increased. In the example illustrated in FIG. 17, a difference in the throughput between the case where the prediction by the prediction section 220 is incorrect and the case where all predictions are correct become the maximum in a case where the number of the outstanding is 44. If the number of the outstanding exceeds 45, the difference in the throughput becomes small and an influence in the throughput of the case where the prediction is incorrect becomes small. Moreover, the number of the outstanding to which the information processing apparatus IPE is practically applied is appropriately 10 at the maximum and an influence on the throughput by the failure of the prediction is small compared to a case where the number of the outstanding exceeds 10.

As described above, in the embodiments illustrated in FIGS. 1 to 17, the input and output control device IOH may determine the node ND transmitting the packet based on a prediction result of the prediction section 220 without having the source address decoder 20 and the address decoder table 22. As a result, the input and output control device IOH may be coupled to the node ND without depending on the generation of the CPU and even if the new CPU is developed, it is possible to transmit and receive the packet without decreasing the coupling property between the input and output control device IOH and the node ND.

The circuit scale of the input and output control device IOH may be decreased compared to the circuit scale of the input and output control device IOH on which the address decoder table 22 and the source address decoder 20 are mounted. The router 240 of the input and output control device IOH may obtain the identification information NDID that indicates the node ND of the transmission source of the response packet by referring to the existing routing table 250 without providing a new circuit. The response receiving section 48 of the input and output control device IOH may update the identification information NDID of the access history table 210 by referring to the existing request source table 42 without providing a new circuit.

If an effective identification information NDID is not stored in the access history table 210, the prediction section 220 selects the identification information NDID according to the predetermined rule and thereby the request generation section 46 may transmit the packet to one of the nodes ND without an erroneous operation.

Figure 18:
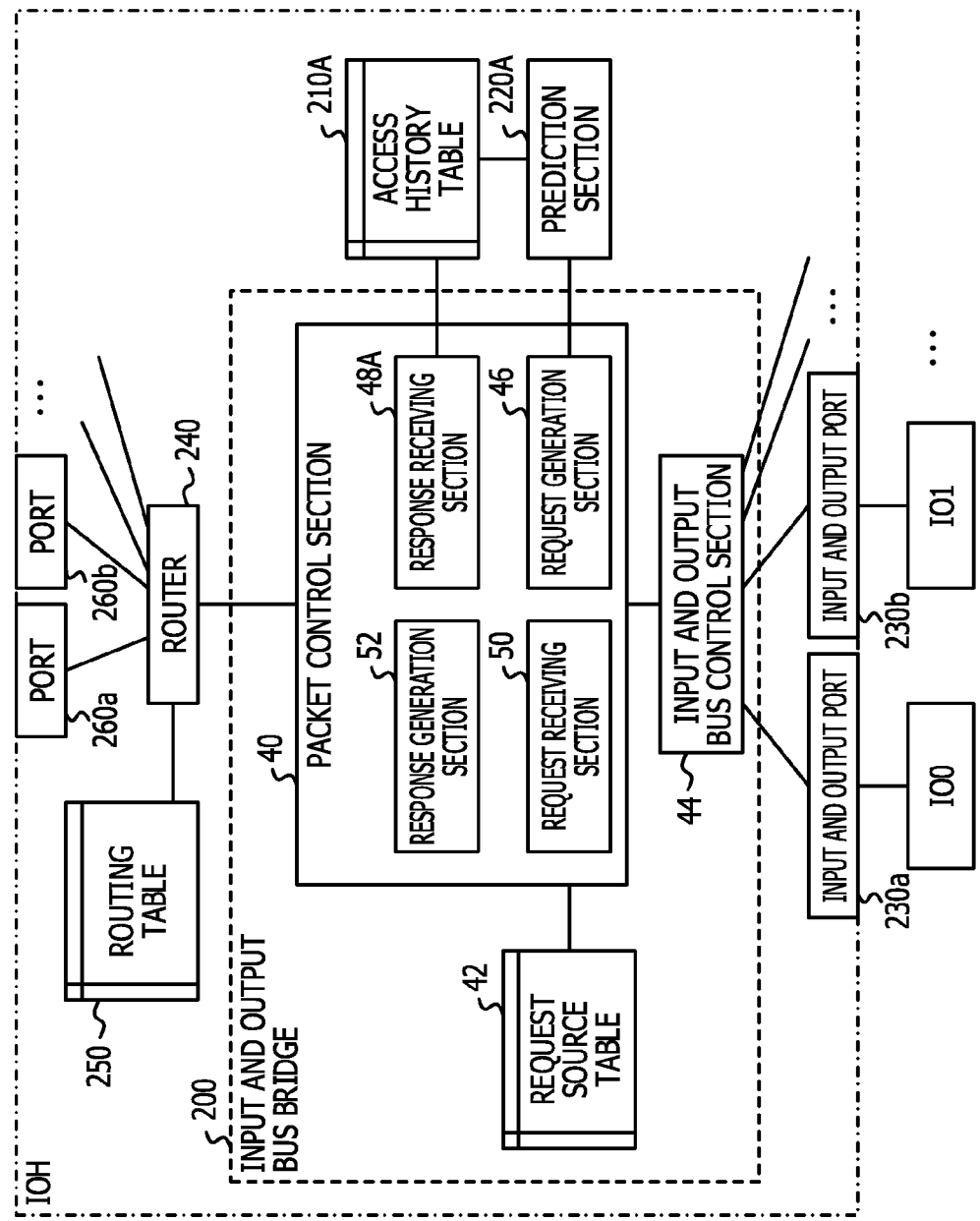
FIG. 18 illustrates another embodiment of an information processing apparatus, an input and output control device, and a control method of the information processing apparatus.

FIG. 18 illustrates another embodiment of an information processing apparatus, an input and output control device, and a control method of the information processing apparatus. The same reference numerals are given to the same elements as those described in FIGS. 1 to 17 and detailed description thereof will be omitted. An input and output control device IOH illustrated in FIG. 18 has an access history table 210A, a prediction section 220A, and a response receiving section 48A instead of the access history table 210, the prediction section 220, and the response receiving section 48 illustrated in FIG. 5. In the input and output control device IOH, configurations other than the access history table 210A, the prediction section 220A, and the response receiving section 48A are the same as the configurations of the input and output control device IOH illustrated in FIG. 5. Furthermore, a configuration of a node ND (CPU) coupled to the input and output control device IOH may be the same as or similar to the configuration illustrated in FIG. 2. That is, a configuration of the information processing apparatus of the embodiment may be the same as or similar to the configuration illustrated in FIG. 1. An example of the access history table 210A is illustrated in FIG. 19, an example of an operation of the prediction section 220A is illustrated FIG. 20, and an example of the response receiving section 48A is illustrated FIG. 21.

Figure 19:
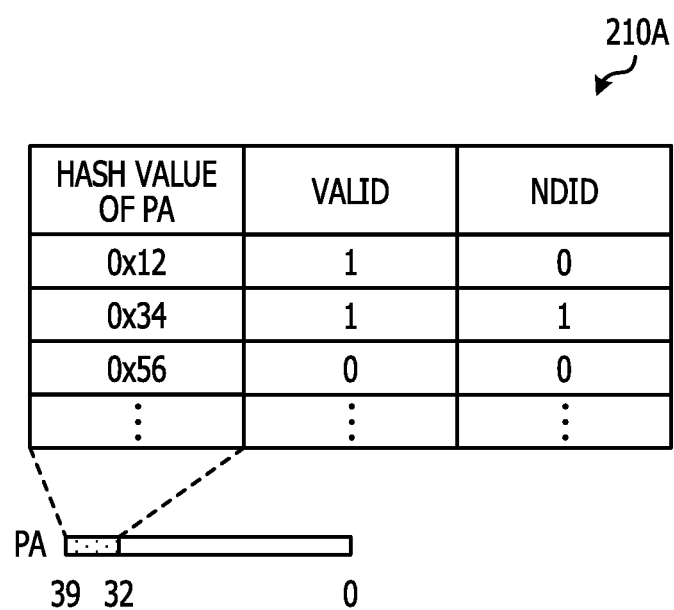
FIG. 19 illustrates an example of an access history table illustrated in FIG. 18.

FIG. 19 illustrates an example of the access history table 210A illustrated in FIG. 18. The access history table 210A has a plurality of regions storing a hash value of a physical address PA, a VALID flag, a transmission destination of a memory access request, and identification information NDID indicating a predicted node ND included in the packet. That is, the access history table 210A stores a plurality of entries including the hash value of the physical address PA, the VALID flag, and the identification information NDID. The VALID flag and the identification information NDID stored in the access history table 210A are similar to the VALID flag and the identification information NDID stored in the access history table 210 illustrated in FIG. 8.

The hash value of the physical address PA stored in the access history table 210A is indicated by bits of one of a bit column of the physical address PA included in response packet from the node ND. In the example illustrated in FIG. 19, the hash value is 8 higher-order bits (PA [39:32]) of the physical address PA [39:0]. That is, a hash function is a function that extracts PA [39:32] from the physical address PA. Moreover, a hash value generated from the physical address PA using another hash function may be stored in the access history table 210A.

Similar to the access history table 210 illustrated in FIG. 8, the access history table 210A illustrated in FIG. 19 has a scale smaller than that of the address decoder table 22 illustrated in FIG. 3. Furthermore, the source address decoder 20 and the prediction section 220A have scales similar to each other. Thus, a circuit scale of the input and output control device IOH on which the prediction section 220A and the access history table 210A are mounted may be decreased compared to a circuit scale of the input and output control device IOH on which the source address decoder 20 and the address decoder table 22 are mounted.

Figure 22:
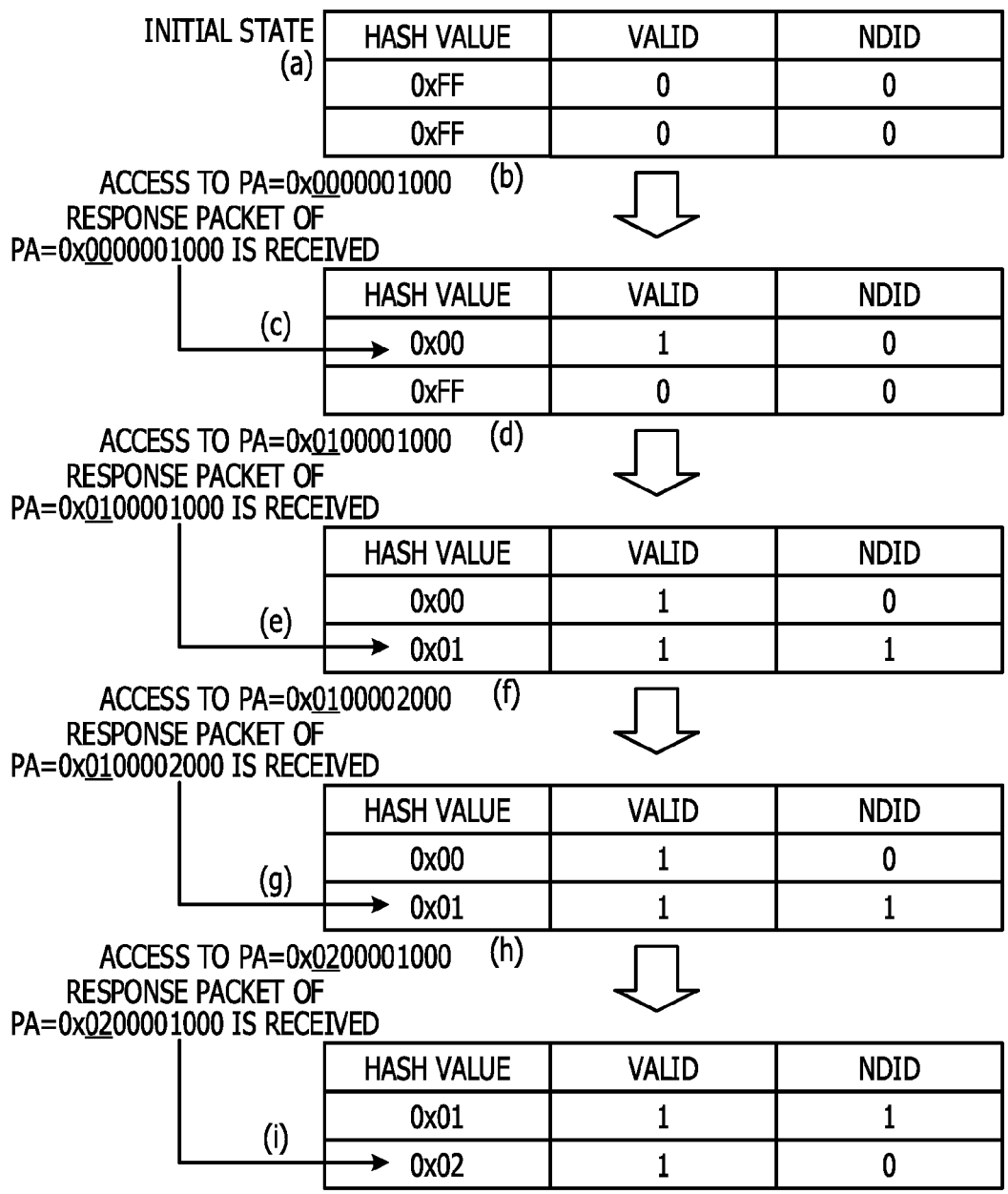
FIG. 22 illustrates an example of updating the access history table illustrated in FIG. 19.

The access history table 210A is referred to by the prediction section 220A illustrated in FIG. 18 and is updated by the response receiving section 48A illustrated in FIG. 18. Since the data is input and output by block unit such as a sector, the input and output device IO such as a hard disk drive device often accesses the continued storage region of the memory MEM. In this case, the hash value of the physical address PA included in a plurality of packets (store request or load request) transmitted to the node ND based on the memory access from the input and output device IO is continuous. Thus, the prediction section 220A may correctly predict the identification information NDID of the node ND of the transmission destination of the packet based on the hash value stored in the access history table 210A. An example of updating the access history table 210A by the packet control section 40 is illustrated in FIG. 22.

Figure 20:
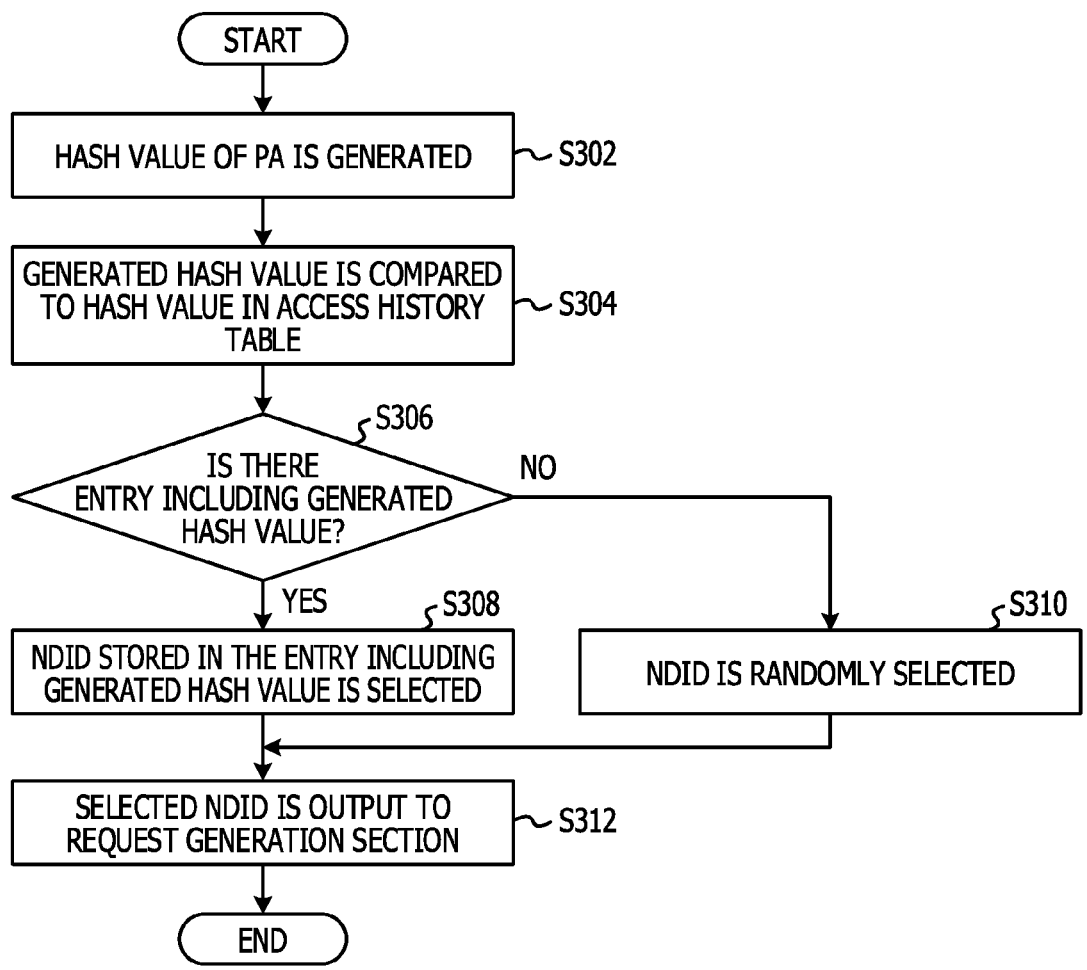
FIG. 20 illustrates an example of an operation of a prediction section illustrated in FIG. 18.

FIG. 20 illustrates an example of an operation of the prediction section 220A illustrated in FIG. 18. FIG. 20 illustrates an example of the control method of the information processing apparatus IPE. The prediction section 220A starts the operation illustrated in FIG. 20 if the packet control section 40 receives the memory access request from the input and output device IO. Moreover, the operation illustrated in FIG. 20 is executed instead of steps S208, S210, and S212 illustrated in FIG. 10. That is, the prediction section 220A searches for the node ND accessed in the past corresponding to the hash value of the physical address PA instead of searching for the node ND which the input and output device IO issuing the memory access request accessed in the past. An operation of the input and output control device IOH to transmit the packet of the store request or the load request to the CPU is similar to that of FIG. 10 except that the operation of FIG. 20 is executed instead of steps S208, S210, and S212 of FIG. 10.

First, in step S302, the prediction section 220A receives the physical address PA included in the memory access request issued by the input and output device IO from the packet control section 40, removes 8 bits [39:32] of the received physical address PA, and generates the hash value.

Next, in step S304, the prediction section 220A compares the generated hash value to the hash value stored in the access history table 210A. Next, in step S306, the prediction section 220A determines whether there is the entry including the generated hash value in the access history table 210A.

If there is the entry including the generated hash value, in step S308, the prediction section 220A selects the identification information NDID included in the entry together with the generated hash value. Meanwhile, if there is no entry including the generated hash value, in step S310, the prediction section 220A randomly selects one kind of the identification information NDID that identifies the node ND coupled to the interconnect ICNT. That is, if there is no entry including the generated hash value, the prediction section 220A randomly predicts the node ND transmitting the packet.

Moreover, similar to step S212 illustrated in FIG. 10, if there is no entry including the generated hash value, the prediction section 220A may select the identification information NDID according to a predetermined rule other than random. The predetermined rule other than random is an ascending order, a descending order, and the like. Then, in step S312, the prediction section 220A outputs the selected identification information NDID to the request generation section 46 and the operation is finished.

Figure 21:
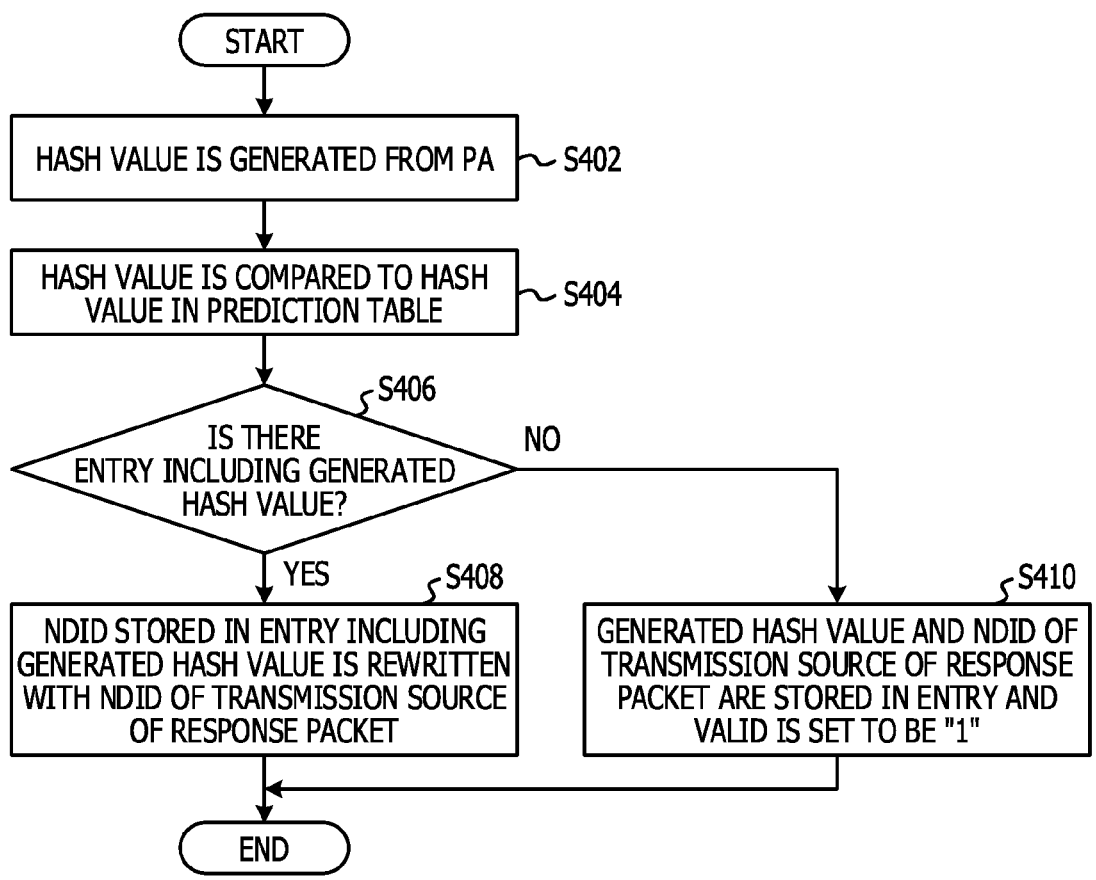
FIG. 21 illustrates an example of an operation of a response receiving section illustrated in FIG. 18.

FIG. 21 illustrates an example of an operation of the response receiving section 48A illustrated in FIG. 18. FIG. 21 illustrates an example of the control method of the information processing apparatus IPE. The response receiving section 48A starts the operation illustrated in FIG. 21 if the response packet is received from one of the nodes ND through the router 240. Moreover, the operation illustrated in FIG. 21 is executed instead of step S230 illustrated in FIG. 12. The operation of the case where the input and output control device IOH receives the response packet from the CPU is similar to that of FIG. 12 except that the operation of FIG. 21 is executed instead of step S230 of FIG. 12.

First, in step S402, the response receiving section 48A removes 8 bits [39:32] of the physical address PA included in the response packet and generates the hash value. Next, in step S404, the response receiving section 48A compares the generated hash value to the hash value stored in the access history table 210A.

Next, in step S406, the response receiving section 48A determines whether the entry including the generated hash value is in the access history table 210. If there is the entry including the generated hash value, the response receiving section 48A executes step S408 and if there is no entry including the generated hash value, the response receiving section 48A executes step S410.

In step S408, in the access history table 210A, the response receiving section 48A rewrites the identification information NDID included in the entry with the identification information NDID obtained in step S222 of FIG. 12 together with the generated hash value. That is, the response receiving section 48A updates the access history table 210A by registering the node ND of the transmission source that transmits the response packet in the access history table 210A. Then, an updating operation of the access history table 210A by the response receiving section 48A is completed.

Meanwhile, in step S410, the response receiving section 48A stores the entry including the hash value generated in step S402 and the identification information NDID obtained in step S222 of FIG. 12 in a vacant region. Then, the VALID flag of the entry including the generated hash value and the identification information NDID is set to be "1". Moreover, if there is no region for storing the entry, the entry including the generated hash value and the identification information NDID obtained in step S222 of FIG. 12 is stored in the access history table 210A by overwriting the entry based on an eviction algorithm. As the eviction algorithm, First-In First-Out (FIFO), or Least Recently Used (LRU) and the like are used. Then, the updating operation of the access history table 210A by the response receiving section 48A is completed.

FIG. 22 illustrates an example of updating the access history table 210A illustrated in FIG. 19. Moreover, FIG. 22 illustrates an example of the control method of the information processing apparatus IPE. In FIG. 22, the stored number of the entries in the access history table 210A is "2". In FIG. 22, underlines given to 8 higher-order bits of the physical address PA illustrate the hash values.

All regions storing the entry in the access history table 210A are set to be an initial state by the initialization process after power supply is input into the information processing apparatus IPE ((a)). An initial value of the hash value is "0xFF" and an initial value of the VALID flag and an initial value of the identification information NDID are "0". Moreover, an initial value of the hash value may be "0x00" and the like.

First, the input and output control device IOH makes the prediction section 220A predict the identification information NDID that indicates the node ND of the transmission source of the packet based on the memory access request indicating the physical address PA="0x0000001000" from the input and output device IO. Since the entry including the generated hash value (0x00) does not exist in the access history table 210A, the prediction section 220A randomly generates the identification information NDID. Then, the input and output control device IOH transmits the packet including the physical address PA="0x0000001000" and the identification information NDID that is randomly generated ((b)).

Thereafter, the input and output control device IOH receives the response packet including the physical address PA="0x0000001000" from the node ND0. The response receiving section 48A illustrated in FIG. 18 generates the hash value (0x00) from the received physical address PA. Then, the response receiving section 48A stores the generated hash value in a vacant region of the access history table 210A, sets the VALID flag to be "1", and sets the identification information NDID to be "0" indicating the node ND0 that is the transmission source of the received response packet ((c)). That is, the entry is stored in the access history table 210A.

Next, the prediction section 220A predicts the identification information NDID that indicates the node ND of the transmission source of the packet based on the memory access request indicating a physical address PA="0x0100001000" from the input and output device IO. Since the entry including the generated hash value (0x01) does not exist in the access history table 210A, the prediction section 220A randomly generates the identification information NDID. Then, the input and output control device IOH transmits the packet including the physical address PA="0x0100001000" and the identification information NDID that is randomly generated ((d)).

Thereafter, the input and output control device IOH receives the response packet including the physical address PA="0x0100001000" from the node ND1. The response receiving section 48A generates the hash value (0x01) from the received physical address PA. Then, the response receiving section 48A stores the generated hash value in a vacant region of the access history table 210A, sets the VALID flag "1", and sets the identification information NDID to be "1" indicating the node ND1 that is the transmission source of the received response packet ((e)). That is, the entry is stored in the access history table 210A.

Next, the prediction section 220A predicts the identification information NDID that indicates the node ND of the transmission source of the packet based on the memory access request indicating a physical address PA="0x0100002000" from the input and output device IO. The prediction section 220A generates the hash value (0x01) and reads the identification information NDID (=1) from the entry including the hash value (0x01) stored in the access history table 210A. Then, the input and output control device IOH transmits the packet including the physical address PA="0x0100002000" and the read identification information NDID (=1) ((f)).

Thereafter, the input and output control device IOH receives the response packet including the physical address PA="0x0100002000" from the node ND1. The response receiving section 48A generates the hash value (0x01) from the received physical address PA. Since the entry including the generated hash value is in the access history table 210A, the response receiving section 48A stores "1" indicating the node ND1 that is the transmission source of the received response packet in the identification information NDID of the entry including the generated hash value ((g)).

Next, the prediction section 220A predicts the identification information NDID that indicates the node ND of the transmission source of the packet based on the memory access request indicating a physical address PA="0x0200001000" from the input and output device IO. Since the entry including the generated the hash value (0x02) does not exist in the access history table 210A, the prediction section 220A randomly generates the identification information NDID. Then, the input and output control device IOH transmits the packet including the physical address PA="0x0200001000" and the identification information NDID that is randomly generated ((h)).

Thereafter, the input and output control device IOH receives the response packet including the physical address PA="0x0200001000" from the node ND0. The response receiving section 48A generates the hash value (0x02) from the received physical address PA. Since a vacant region does not exist in the access history table 210A, the response receiving section 48A rewrites the entry based on the eviction algorithm. In this example, the entry stored in a second row of the access history table 210A is rewritten with the hash value (0x02) and the identification information NDID (=0) ((i)).

As described above, also in the embodiment illustrated in FIGS. 18 to 22, it is possible to obtain the same effects as those of the embodiment illustrated in FIGS. 1 to 17. Furthermore, in the embodiment illustrated in FIGS. 18 to 22, the prediction section 220A may correctly predict the identification information NDID of the node ND of the transmission source of the packet by storing the entry including the hash value of the physical address PA in the access history table 210A.

Figure 23:
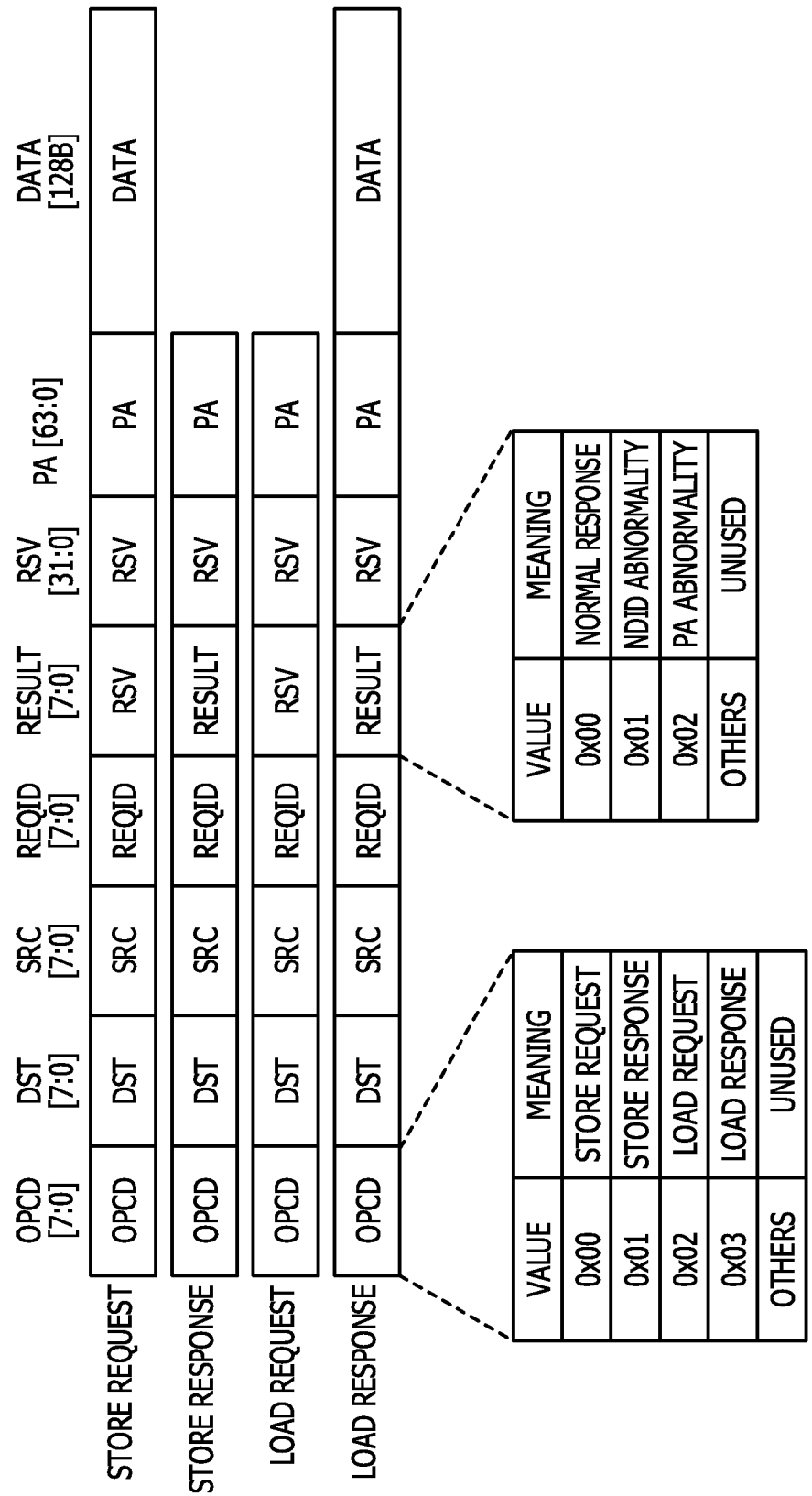
FIG. 23 illustrates an example of a packet in another embodiment of an information processing apparatus, an input and output control device, and a control method of the information processing apparatus.

FIG. 23 illustrates an example of a packet in another embodiment of an information processing apparatus, an input and output control device, and a control method of the information processing apparatus. In the embodiment, a source SRC indicating the identification information NDID of the transmission source of the packet is added to the response packet (packets of store response and load response). A configuration of the packet other than that is similar to that of FIG. 9. A configuration of the information processing apparatus IPE is the same as or similar to the configuration illustrated in FIG. 1 and a configuration of the CPU of each node ND is the same as or similar to the configuration illustrated in FIG. 2. A configuration of the input and output control device IOH is similar to the configuration illustrated in FIG. 5 except that the operation of the response receiving section 48 is different. Moreover, the packet illustrated in FIG. 23 may be applied to the information processing apparatus IPE including the input and output control device IOH illustrated in FIG. 18. In this case, the configuration of the input and output control device IOH is similar to the configuration illustrated in FIG. 18 except that the operation of the response receiving section 48A is different.

In FIG. 23, since response packet includes the source SRC, the response receiving section 48 (or 48A) may obtain the identification information NDID that indicates the node ND that is the transmission source of the response packet without referring to the routing table 250 when receiving the response packet.

Figure 24:
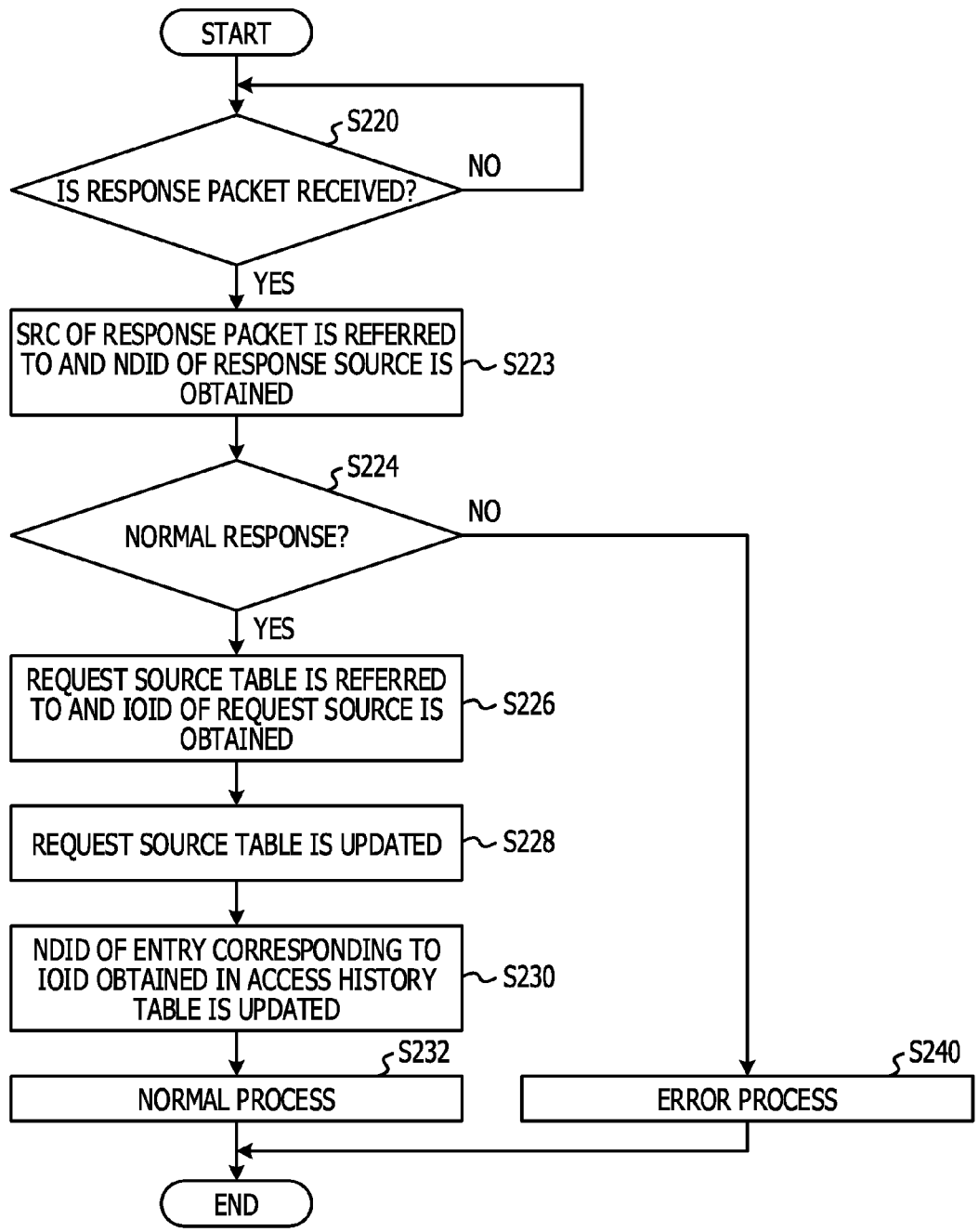
FIG. 24 illustrates an example of an operation if the input and output control device transmitting and receiving the packet illustrated in FIG. 23 receives a response packet from a CPU.

FIG. 24 illustrates an example of an operation if the input and output control device IOH transmitting and receiving the packet illustrated in FIG. 23 receives the response packet from the CPU. Moreover, FIG. 24 illustrates an example of a control method of the information processing apparatus IPE. The same reference numerals are given to the same as or similar processes in FIG. 12 and detailed description will be described. FIG. 24 is similar to the operation of FIG. 12 except that step S223 is executed instead of step S222 illustrated in FIG. 12.

In step S223, the response receiving section 48 (or 48A) refers to the source SRC in the response packet and obtains the identification information NDID that indicates the node ND that is the transmission source of the response packet. Thus, the input and output control device IOH may obtain the identification information NDID that indicates the node ND that is the transmission source of the response packet without referring to the routing table 250. Moreover, the process for obtaining the identification information NDID based on the source SRC in the response packet may be executed by the router 240 other than the response receiving section 48 (or 48A).

As described above, also in the other embodiment illustrated in FIGS. 23 to 24, it is possible to obtain similar effects to the embodiment illustrated in FIGS. 1 to 22. Furthermore, in the other embodiment illustrated in FIGS. 23 to 24, it is possible to obtain the identification information NDID of the transmission source of the response packet without referring to the routing table 250. As a result, the other embodiment may shorten the time for obtaining the identification information NDID of the transmission source of the response packet and improve process efficiency when receiving the response packet compared to the embodiment illustrated in FIGS. 1 to 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus comprising:
a plurality of node devices that respectively include an arithmetic processing unit and one or more first memories coupled to the arithmetic processing unit; and
an input and output control device that is coupled to the plurality of node devices and one or more input and output devices,
wherein the input and output control device includes
one or more second memories configured to store history information including an entry in which input and output device identification information for identifying an input and output device that is accessed based on a request corresponds to node identification information for identifying a node device of the plurality of node devices which is a transmission source of the request, and
an input and output bus bridge coupled to the one or more second memories and configured to:
determine the node identification information corresponding to the input and output device identification information that indicates an input and output device which outputs a memory access request to the one or more first memories based on search of the entry in the history information,
generate a packet in which the determined node identification information is set to a memory access destination based on the memory access request, and
output the generated packet,
wherein each of the plurality of node devices includes
a third memory configured to store first corresponding information in which a physical address range corresponds to the node identification information for each physical address range of the one or more first memories, and
a processor coupled to the third memory and configured to:
receive the packet output from the input and output control device, obtain the node identification information corresponding to a physical address included in the received packet based on the first corresponding information, determine whether the obtained node identification information is the node identification information identifying own node device, and transfer the received packet to another node device when it is determined that the obtained node identification information is not the node identification information that identifies the own node device.

2. The information processing apparatus according to claim 1, wherein the input and output control device further comprising:
a plurality of ports that is coupled to the plurality of node devices,
wherein the one or more second memories is configured to store second corresponding information in which the node identification information that identifies the plurality of node devices coupled to the plurality of ports corresponds to the plurality of ports, and
the input and output bus bridge is configured to:
receive a packet, and
obtain the node identification information that identifies the node device that is the transmission source of the packet corresponding to the port receiving the packet based on the second corresponding information.

3. The information processing apparatus according to claim 2, wherein the input and output bus bridge of the input and output control device is configured to store the obtained node identification information in the history information.

4. The information processing apparatus according to claim 3, wherein
the one or more second memories is configured to store request information including the entry including the input and output device identification information indicating the input and output device that outputs the memory access request to the one or more first memories for each packet,
the packet that is generated by the input and output control device and the packet that is received from one of the plurality of node devices by the input and output control device include entry identification information that identifies an entry of the entries in the request information which corresponds to the input and output device outputting the memory access request, and
the input and output bus bridge is configured to:
obtain the input and output device identification information corresponding to the entry identification information included in the received packet based on search of the entry in the request information, and
store the obtained node identification information in the entry of the entries in the history information which corresponds to the obtained input and output device identification information.

5. The information processing apparatus according to claim 1, wherein the input and output bus bridge is configured to:
receive a packet, and
obtain the node identification information that identifies the node device of the transmission source included in the received packet.

6. The information processing apparatus according to claim 1, wherein the entry in the history information includes address range information indicating an address range including the physical address included in the packet and the node identification information, and the input and output bus bridge is configured to search for the node identification information corresponding to the address range information in place of the input and output device identification information of the input and output device.

7. The information processing apparatus according to claim 1, wherein the entry in the history information includes valid information which corresponds to the input and output device identification information and the node identification information and which indicates whether the node identification information is valid or invalid, and the input and output bus bridge is configured to determine the node identification information according to a predetermined rule when the entry including the node identification information indicating that the valid information is valid is not found by the search of the entry in the history information.

8. An input and output control device that is coupled to a plurality of node devices and one or more input and output devices, each node device including an arithmetic processing unit and one or more first memories coupled to the arithmetic processing unit, the input and output control device comprising:

one or more second memories configured to store history information including an entry in which input and output device identification information for identifying an input and output device that is accessed based on a request corresponds to node identification information for identifying a node device of the plurality of node devices which is a transmission source of the request; and an input and output bus bridge coupled to the one or more second memories and configured to:
determine the node identification information corresponding to the input and output device identification information that indicates an input and output device which outputs a memory access request to the one or more first memories based on search of the entry in the history information,
generate a packet in which the determined node identification information is set to a memory access destination based on the memory access request, and
output the generated packet, wherein each of the plurality of node devices is configured to:
receive the packet output from the input and output control device,
obtain the node identification information corresponding to a physical address included in the received packet based on first corresponding information, the first corresponding information storing in which a physical address range corresponds to the node identification information for each physical address range of the one or more first memories,
determine whether the obtained node identification information is the node identification information identifying own node device, and
transfer the received packet to another node device when it is determined that the obtained node identification information is not the node identification information that identifies the own node device.

9. The input and output control device according to claim 8, further comprising:
a plurality of ports that is coupled to the plurality of node devices,
wherein
the one or more second memories is configured to store second corresponding information in which the node identification information that identifies the plurality of node devices coupled to the plurality of ports corresponds to the plurality of ports, and
the input and output bus bridge is configured to:
receive a packet, and
obtain the node identification information that identifies the node device that is the transmission source of the packet corresponding to the port receiving the packet based on the second corresponding information.

10. The input and output control device according to claim 9, wherein the input and output bus bridge is configured to:
store the obtained node identification information in the history information.

11. The input and output control device according to claim 10, wherein
the one or more second memories is configured to store request information including the entry including the input and output device identification information indicating the input and output device that outputs the memory access request to the one or more first memories for each packet,
the packet that is generated by the input and output control device and the packet that is received from one of the plurality of node devices by the input and output control device include entry identification information that identifies an entry of the entries in the request information which corresponds to the input and output device outputting the memory access request, and
the input and output bus bridge is configured to:
obtain the input and output device identification information corresponding to the entry identification information included in the received packet based on search of the entry in the request information, and
store the obtained node identification information in the entry of the entries in the history information which corresponds to the obtained input and output device identification information.

12. The input and output control device according to claim 8, wherein the input and output bus bridge is configured to:
receive a packet, and
obtain the node identification information that identifies the node device of the transmission source included in the received packet.

13. The input and output control device according to claim 8, wherein
the entry in the history information includes address range information indicating an address range including the physical address included in the packet and the node identification information, and
the input and output bus bridge is configured to search for the node identification information corresponding to the address range information in place of the input and output device identification information of the input and output device.

14. The input and output control device according to claim 8, wherein the entry in the history information includes valid information which corresponds to the input and output device identification information and the node identification information and which indicates whether the node identification information is valid or invalid, and
the input and output bus bridge is configured to determine the node identification information according to a predetermined rule when the entry including the node identification information indicating that the valid information is valid is not found by the search of the entry in the history information.

15. A method of controlling an information processing apparatus including a plurality of node devices that respectively include an arithmetic processing unit and one or more first memories coupled to the arithmetic processing unit, one or more input and output devices, and an input and output control device that is coupled to the plurality of node devices and one or more input and output devices, the method comprising:
determining, by the input and output control device, based on search of an entry in history information including an entry in which input and output device identification information for identifying the input and output device that is accessed based on a request corresponds to node identification information for identifying a node device of the plurality of node devices which is a transmission source of the request, the node identification information corresponding to the input and output device identification information that indicates an input and output device which outputs a memory access request to the one or more first memories;
generating, by the input and output control device, a packet in which the determined node identification information is set to a memory access destination based on the memory access request;
outputting, by the input and output control device, the generated packet;
receiving, by at least one of the plurality of node devices, the packet output from the input and output control device;
obtaining, by the at least one of the plurality of node devices, the node identification information corresponding to a physical address included in the received packet based on first corresponding information, the first corresponding information storing in which a physical address range corresponds to the node identification information for each physical address range of the one or more first memories;
determining, by the at least one of the plurality of node devices, whether the obtained node identification information is the node identification information identifying own node device; and
transferring, by the at least one of the plurality of node devices, the received packet to another node device when it is determined that the obtained node identification information is not the node identification information that identifies the own node device.

16. The method according to claim 15, wherein
the input and output control device includes a plurality of ports that is coupled to the plurality of node devices,
the method further comprising:
receiving, by the input and output control device, a packet; and
obtaining, by the input and output control device, based on second corresponding information in which the node identification information that identifies the plurality of node devices coupled to the plurality of ports corresponds to the plurality of ports, the node identification information that identifies the node device that is the transmission source of the packet corresponding to the port receiving the packet.

17. The method according to claim 16, further comprising:
storing, by the input and output control device, the obtained node identification information in the history information.

18. The method according to claim 15, further comprising:
receiving, by the input and output control device, a packet; and
obtaining, by the input and output control device, the node identification information that identifies the node device of the transmission source included in the received packet.

19. The method according to claim 15, wherein the entry in the history information includes address range information indicating an address range including the physical address included in the packet and the node identification information, and
the method further comprising:
searching for the node identification information corresponding to the address range information in place of the input and output device identification information of the input and output device.

20. The method according to claim 15, wherein the entry in the history information includes valid information which corresponds to the input and output device identification information and the node identification information and which indicates whether the node identification information is valid or invalid, and
the method further comprising:
determining the node identification information according to a predetermined rule when the entry including the node identification information indicating that the valid information is valid is not found by the search of the entry in the history information.

\* \* \* \* \*